(12) United States Patent
Furuta

(10) Patent No.: US 8,897,296 B2
(45) Date of Patent: Nov. 25, 2014

(54) COMMUNICATION DEVICE AND DATA TRANSFER METHOD

(75) Inventor: Daitarou Furuta, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 35 days.

(21) Appl. No.: 13/418,543

(22) Filed: Mar. 13, 2012

(65) Prior Publication Data
US 2012/0236862 A1    Sep. 20, 2012

(30) Foreign Application Priority Data
Mar. 18, 2011   (JP) .................. 2011-060424

(51) Int. Cl.
*H04L 29/06*   (2006.01)
*H04W 28/06*   (2009.01)

(52) U.S. Cl.
CPC .............. *H04L 69/04* (2013.01); *H04L 69/22* (2013.01); *H04W 28/06* (2013.01)
USPC ............ 370/389; 370/471; 370/392; 370/349

(58) Field of Classification Search
CPC ......... H04L 69/04; H04L 69/22; H04L 29/06; H04L 69/16; H04L 69/161; H04L 12/189; H04L 29/06027; H04L 63/164; H04L 65/4076; H04L 65/607; H04L 65/608; H04L 67/04; H04L 67/14; H04L 67/22; H04L 69/03; H04W 28/06
See application file for complete search history.

(56) References Cited

U.S. PATENT DOCUMENTS

| 2004/0181741 A1* | 9/2004 | Hata et al. ...................... 714/776 |
| 2009/0086707 A1* | 4/2009 | Meylan ......................... 370/349 |
| 2010/0260098 A1* | 10/2010 | Ulupinar et al. .............. 370/315 |
| 2010/0272006 A1* | 10/2010 | Bertrand et al. ............. 370/315 |
| 2010/0284314 A1* | 11/2010 | Pelletier et al. ............... 370/310 |

FOREIGN PATENT DOCUMENTS

JP    2005-217994    8/2005

* cited by examiner

*Primary Examiner* — Un C Cho
*Assistant Examiner* — M Mostazir Rahman
(74) *Attorney, Agent, or Firm* — Katten Muchin Rosenman LLP

(57) ABSTRACT

There is provided a communication device to transfer a received packet to a data terminal device, the communication device being coupled to the data terminal device in a wire or wireless system, the communication device including: a determining unit configured to determine whether or not a compression state of a compressed header added to the packet is a predetermined compression state; and a transfer unit configured to transfer the compressed header to the data terminal device and to transmit an activation request signal used on case of activating a routing module using an RoHC algorithm to the data terminal device including the routing module, when the compression state of the compressed header is the predetermined compression state, or to decompress the compressed header and to transmit the decompressed header to the data terminal device, when the compression state of the compressed header is not the predetermined compression state.

2 Claims, 23 Drawing Sheets

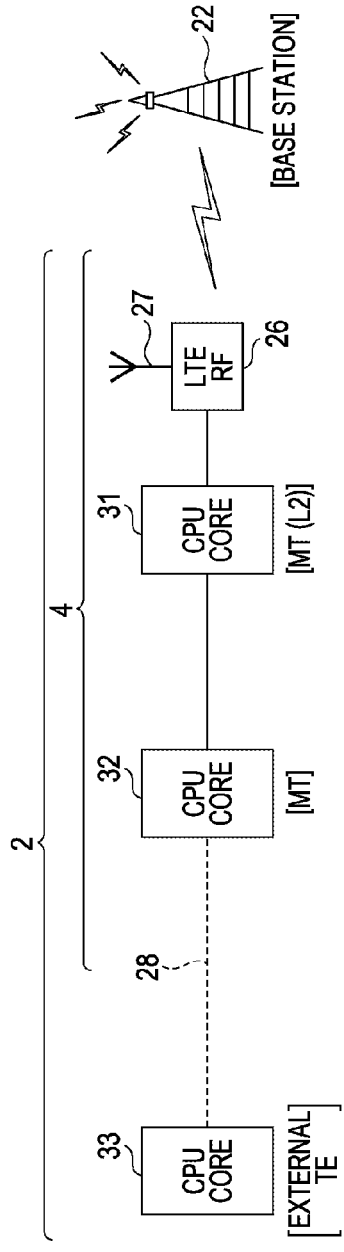
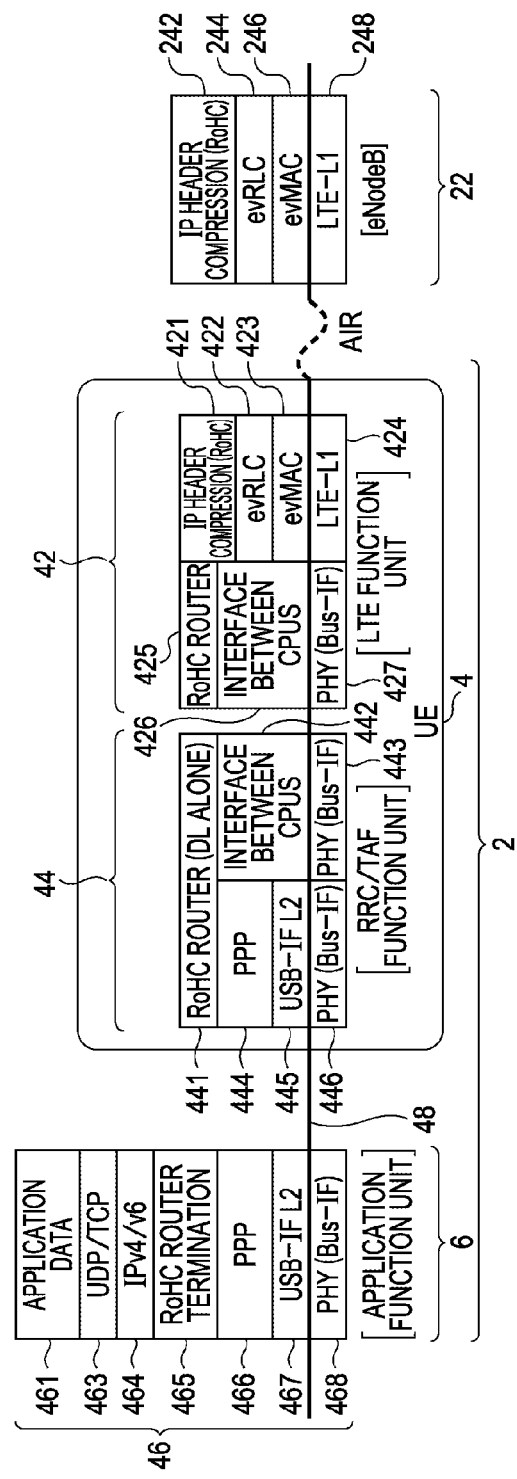
FIG. 3A
FIG. 3B

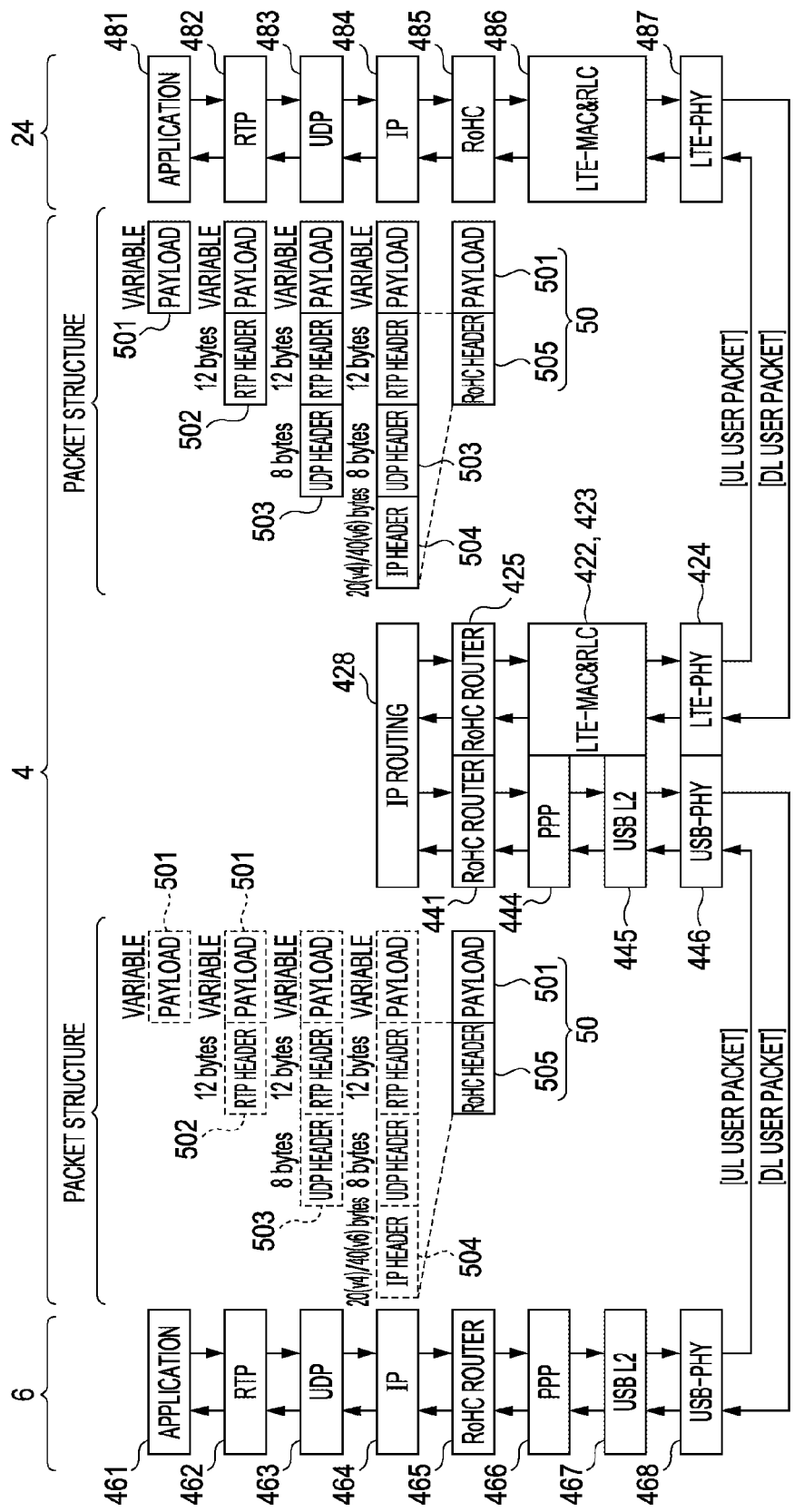

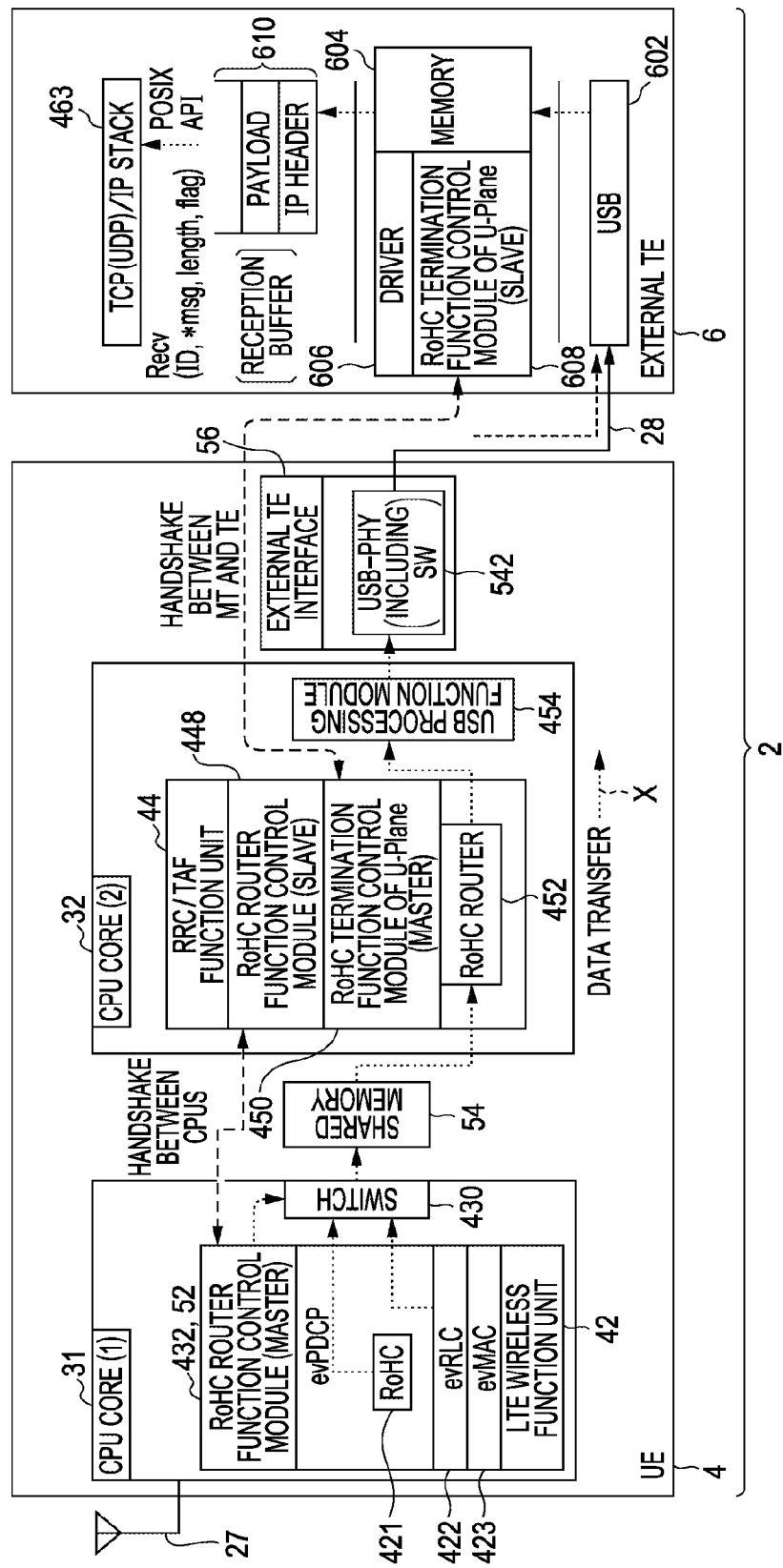

FIG. 19

MAXIMUM COMPRESSION RATIO OF HEADER

| PROTOCOL HEADER | NORMAL HEADER SIZE [byte] | RoHC COMPRESSED HEADER SIZE [byte] | COMPRESSION RATIO [%] |
|---|---|---|---|
| IP/TCP | 40 | 4 | 90 |
| IP/UDP | 28 | 1 | 96.4 |
| IP/UDP/RTP | 40 | 1 | 97.5 |

COMMUNICATION DEVICE AND DATA TRANSFER METHOD

CROSS-REFERENCE TO RELATED APPLICATION

This application is based upon and claims the benefit of priority of the prior Japanese Patent Application No. 2011-060424, filed on Mar. 18, 2011, the entire contents of which are incorporated herein by reference.

FIELD

The embodiments discussed herein are related to a communication device and a data transfer method.

BACKGROUND

There is a communication mode for transferring data transferred from a base station side to a data terminal device such as a personal computer (PC) or the like using a communication terminal such as a cellular phone as a communication modem or router.

An optimal communication path can be built according to an Internet Protocol (IP) address, by a communication terminal having a router function being connected to a personal digital assistant (PDA) or PC (e.g., Japanese Laid-open Patent Publication No. 2005-217994).

The 3rd Generation Partnership Project (3GPP) stipulates Long Term Evolution (LTE) for 3.9G. With the communication standard of LTE, compression or decompression of an IP packet header can be performed at the layer 2 that is Packet Data Convergence Protocol (PDCP). That is to say, transmission or reception of a compressed header can be performed between a communication terminal and an LTE base station.

SUMMARY

According to an aspect of the embodiment, there is provided a communication device to transfer a received packet to a data terminal device, the communication device being coupled to the data terminal device in a wire or wireless system, the communication device including: a determining unit configured to determine whether or not a compression state of a compressed header added to the packet is a predetermined compression state; and a transfer unit configured to transfer the compressed header to the data terminal device and to transmit an activation request signal used on case of activating a routing module using a robust header compression (RoHC) algorithm to the data terminal device including the routing module, when the compression state of the compressed header is the predetermined compression state, or to decompress the compressed header and to transmit the decompressed header to the data terminal device, when the compression state of the compressed header is not the predetermined compression state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are diagrams illustrating an example of a communication system according to a second embodiment;

FIG. 4 is a diagram illustrating an example of a packet structure and header processing;

FIG. 5 is a diagram illustrating an example of a communication system according to a third embodiment;

FIG. 19 is a diagram indicating the maximum compression ratio of a compressed header;

DESCRIPTION OF EMBODIMENTS

In the event of employing a communication device as a communication modem, a transfer protocol such as Universal Serial Bus (USB) that is one of serial bus standards is employed between a data terminal device such as a communication terminal or PC or the like and this communication terminal.

Therefore, even in the event that communication using a compressed header can be performed between the communication terminal (may be referred as a communication device) and the LTE base station, with regard to data transfer to a data terminal device to which the communication terminal is connected, header information to be passed through the communication terminal has to be decompressed from a compressed packet to an uncompressed packet. That is to say, a compressed packet is decompressed between the communication terminal and the data terminal device so as to agree with transmission or reception of an IP packet.

Therefore, data transfer quantity increases depending on connection modes, such as Point-to-Point Protocol (PPP) being used for connection between the communication terminal and the data terminal device, and throughput deteriorates.

Therefore, it has been found to be desirable to ease the data processing of the communication terminal connected to the data terminal device. Further, it is desirable to improve throughput.

First Embodiment

Figure 1:
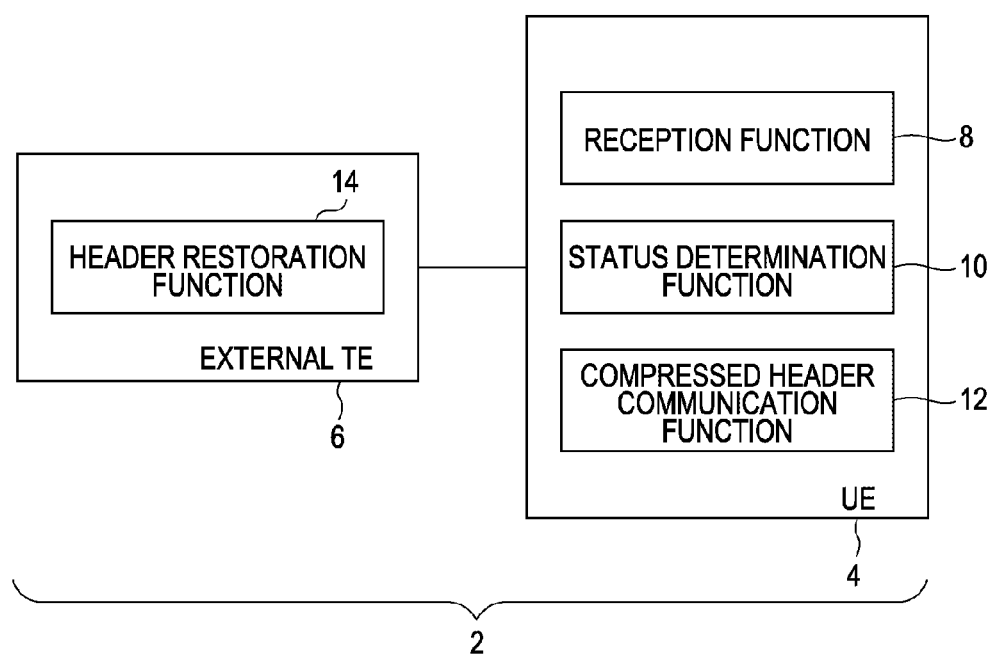
FIG. 1 is a diagram illustrating an example of a packet communication system according a first embodiment.

FIG. 1 will be referenced regarding a first embodiment. FIG. 1 illustrates an example of a communication system.

The communication system 2 illustrated in FIG. 1 is an example of the communication device and data transfer method according to the present disclosure. This communication system 2 includes user equipment (UE) 4 and external terminal equipment (TE) 6. With this communication system 2, a packet is received at the UE 4, and this packet is transferred to the external TE 6 connected to the UE 4 by cable or radio.

The UE 4 is an example of communication terminals (may be referred as communication devices), and has a reception function 8, a state determination function 10, and a compressed header communication function 12. Accordingly, cellular phones are an example thereof as long as the UE 4 is equipment having these functions.

The reception function 8 of the UE 4 is a function for receiving data such as a packet having a compressed header to be transmitted from a base station (BS 22 in FIGS. 3A and 3B). The state determination function 10 is an example of a state determination unit for determining the compressed state of header information, and is a function for determining the compressed state of a compression header appended to a packet. The compressed header communication function 12 is a function for communicating a packet to which a compressed header is appended, and transferring the packet to the external TE 6.

The external TE 6 is an example of data terminal devices, and has a header restoration function 14 for restoring a compressed header to the original header. This external TE 6 is connected to the UE 4 by cable or radio, and restores the compressed header transmitted from the UE 4 to the original header information. This external TE 6 may be any kind of equipment as long as this equipment is equipment configured of, for example, a personal computer, having the packet restoration function 14 which can perform data processing of a modem or the like.

Figure 2:
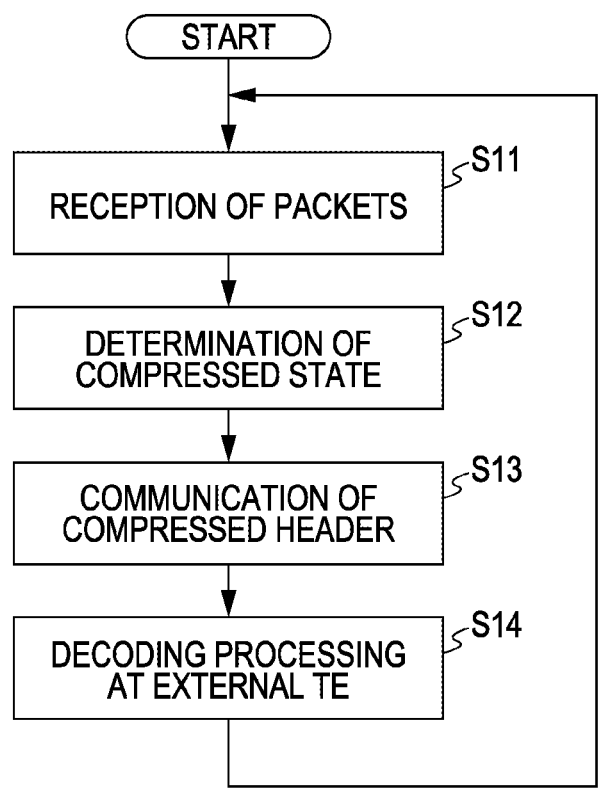
FIG. 2 is a flowchart illustrating an example of the processing procedure of packet processing.

Next, FIG. 2 will be referenced regarding header processing of this communication system 2. FIG. 2 illustrates an example of the processing procedure.

The processing procedure illustrated in FIG. 2 is an example of the data transfer method according to the present disclosure. With this processing procedure, a packet is received at the UE 4, and this packet is transferred from the UE 4 to the external TE 6.

With this processing procedure, a packet is received (Operation S11), and the compressed state of a compressed header appended to this packet is determined (Operation S12). In the event that this compressed state is a stable state, the compressed header is communicated without change according to the determination result thereof, and transferred to the external TE 6 (Operation S13).

Decoding processing of the compressed header is performed at the external TE 6 to which the compressed header has been transferred (Operation S14).

Advantages according to such header processing will be described below. (1) Restoration processing of the compressed packet received at the UE 4 can be omitted, and consequently, the processing at the UE 4 can be eased. (2) A compressed header is communicated to the UE 4, and accordingly, throughput at the UE 4 can be improved. (3) A compressed header is transferred to the external TE 6 connected to the UE 4, and accordingly, header decoding processing by the external TE 6 can be simplified.

Second Embodiment

FIGS. 3A and 3B will be referenced regarding a second embodiment. FIGS. 3A and 3B illustrate an example of a communication system. FIG. 3A illustrates the overview of the communication system, and FIG. 3B illustrates the protocol configuration of the user plane (U-Plane) of the communication system. The configuration illustrated in FIGS. 3A and 3B is an example, and the present disclosure is not restricted to such a configuration. In FIGS. 3A and 3B, the same portions as with FIG. 1 are denoted with the same reference numerals.

The communication system 2 illustrated in FIG. 3A is an example of the communication terminal (may be referred as the communication device) and data transfer method according to the present disclosure.

The UE 4 has various types of control functions such as wireless and cable communication functions, data processing function, and the functions described in FIG. 1, a state notification function, and so forth. According to the wireless communication function, this UE 4 is connected to an LTE base station (BS) 22 by radio. The BS 22 is an LTE wireless base station conforming to the communication standard of LTE, and is a node that is also referred to as an evolved node B (eNode B). Accordingly, the UE 4 is connected to another communication terminal that is a subscriber station (SS) 24 (see FIG. 4) having the common communication standard via the BS 22.

The UE 4 includes an Long Term Evolution-radio frequency (LTE-RF) 26, a central processing unit (CPU) core 31 as the wireless side processing unit of a mobile terminal (MT) (L2), and a CPU core 32 as the cable side processing unit of the MT. The L2 is a layer 2. This L2 is a data link layer, and is a protocol where, with the Open Systems Internet connection (OSI) reference model representing protocol functions, a method for a connected device performing communication is stipulated, and methods such as the configuration of a transmission path, data identification, route selection, and so forth are stipulated. The CPU core 32 of this UE 4 is cable-connected to the external TE 6 by a cable 28.

The BS 22 illustrated in FIG. 3B includes Robust Header Compression (RoHC) 242 in an upper layer. Further, the BS 22 includes Radio Link Control (RLC) 244, Medium Access Control (MAC) 246, and LTE-L1 (physical layer) 248. The RoHC 242 is a header compression algorithm, and has compression and decompression functions for an IP packet header.

The UE 4 includes an LTE wireless function unit 42, a Radio Resource Control (RRC)/Terminal Adaptation function (TAF) function unit 44. The LTE wireless function unit 42 is a function unit for controlling the data reception function 8 (FIG. 1), transmission function, and the state determination function 10 of a compressed header (FIG. 1), and includes a RoHC 421, a RLC 422, a MAC 423, and an LTE-L1 424 in the same way as with the BS 22. Further, the LTE wireless function unit 42 includes a RoHC router 425, an interface 426 between CPUs, and a PHY (physical layer) (Bus-IF) 427. The PHY 427 is a physical layer interface.

The RRC/TAF function unit 44 includes a RoHC router 441, an interface 442 between CPUs, a PHY (Bus-IF) 443, a Point-to-Point Protocol (PPP) 444, a USB (Universal Serial Bus: serial interface for peripheral equipment)-IF (L2) 445, and a PHY (Bus-IF) 446.

The external TE 6 includes an application function unit 46, and this application function unit 46 includes application data 461, User Datagram Protocol (UDP)/Transmission Control Protocol (TCP) 463. Further, this application function unit 46 includes an IPv4/v6464, a RoHC router termination 465, a PPP 466, a USB-IF (L2) 467, and a PHY (Bus-IF) 468.

In this way, a communication route 48 is formed from the UE 4 to the external TE 6, and the RoHC routers 425 and 441 which are IP header compression routers are installed in this communication route 48. In this case, the RoHC router 441 is functioned by downlink (DL) alone for passing data from the BS 22 to the external TE 6. Thus, the packet compression processing at the UE 4 can be omitted by performing header compression using the function for LTE alone to be executed between the UE 4 through the SS 24 (see FIG. 4).

The RoHC processing is closely related to wireless handshake. Various state transitions have to be recognized between the UE 4 and the SS 24. The UE 4 realizes the optimal function roles by compressing and communicating an IP header using the above-mentioned downlink alone.

The RoHC routers 425 and 441 communicate a compressed IP packet without change at the time of RoHC execution (at the time of header compression). Also, in the event that a communication bearer supports data compression, the RoHC routers 425 and 441 transfer the compressed IP packet to a transfer destination based on the stored IP header information, i.e., the external TE 6.

The RoHC router terminal 465 installed in the external TE 6 restores the compressed IP packet header using the IP header stored at the time of session start.

The LTE wireless function unit 42 then determines whether the state of IP header compression is stable, and when the state is stable, informs the RRC/TAF function unit 44 of the state thereof. Thus, the RoHC router 441 of the RRC/TAF function unit 44 communicates a compressed header, i.e., an IP packet having a compressed IP packet header to the communication path 48. In order to realize such processing, handshake for control has to be established from the UE 4 side to the external TE 6, i.e., between the RoHC routers 425 and 441 and from these to the RoHC router terminal 465 on the external TE 6 side at the communication route 48.

FIG. 4 will be referenced regarding packet transfer from the SS 24 to the external TE 6. FIG. 4 illustrates transfer of a packet and header compression. In FIG. 4, the same portions as with FIGS. 3A and 3B are denoted with the same reference numerals.

The SS 24 includes a Real Time Protocol (RTP) 482, a User Datagram Protocol (UDP) 483, an Internet Protocol (IP) 484, a RoHC 485, a Long Term Evolution-Media Access Control (LTE-MAC) & Radio Link Control (RLC) 486, and an LTE-PHY 487 which are protocols along with an application software 481.

With downlink for passing a packet from the SS 24 to the external TE 6, a payload 501 is generated on the SS 24 side by the application software 481. An RTP header 502, a UDP header 503, and an IP header 504 are appended by the processing of the RTP 482, UDP 483, and IP 484, respectively. Such a complicated header portion is compressed to a RoHC header 505 by the RoHC 485. That is to say, with the IP stage, the packet structures of the payload 501, the RTP header 502, UDP header 503, and IP header 504 which are headers are reduced in weight to the packet structure 50 including the RoHC header 505 converted by the compression processing and payload 501. The RoHC header 505 and payload 501 are structured to a compressed header packet (downlink user packet) 50.

The compressed header packet 50 is transferred to the UE 4 via the above-mentioned BS 22 by radio through the LTE-MAC & RLC 486 and LTE-PHY 487.

At the UE 4, the received compressed header 50 reaches the RoHC router 441 through the LTE-PHY (LTE-L1) 424, LTE-MAC & RLC 422, 423, RoHC 421, and IP routing 428. With the IP routing 428, determination is made whether or not the compressed state of the compressed header packet 50 is stable, and in the event that the compressed state of the compressed header packet 50 is stable, performs processing for communicating the compressed header to the above-mentioned communication route 48. This processing includes routing processing such as an activation request of the RoHC router as to the external TE 6. That is to say, in the event that the compressed header is stable, the compressed header packet 50 is communicated to the RoHC router 441, and transferred to the external TE 6 from the RoHC router 441 through the PPP 444, USB-IF (L2) 445, and USB-PSY 446.

The compressed header packet 50 transferred from the UE 4 to the external TE 6 where the header portion is in a compressed state is structured of the above-mentioned RoHC header 505 and payload 501.

With the TE 6 to which this compressed header packet 50 has been transferred, the compressed header 50 reaches the USB-PHY 468, USB-IF (L2) 467, PPP 466, RoHC router 465, and reaches the IP 464, UDP/TCP stack 463, RTP 462, application data 461. The RoHC header 505 of the compressed header packet 50 is decompressed to the IP header 504, UDP header 503, and RTP header 502 through such processing, and the payload 501 is decoded.

Against such downlink, with uplink, routing processing is performed so that the compressed header packet generated at the external TE 6 is communicated to the communication route 48 of the UE 4, and reaches the SS 24 via the BS 22.

This routing processing includes a notification function for informing that in the event that the compressed state of a compressed header is stabilized by the IP header compression function, at the time of communicating to the RoHC router 441, the compressed header packet 50 is communicated from the LTE wireless function unit 42. This notification includes a notification from the LTE wireless function unit 42 to the RRC/TAF function unit 44, and a notification from the RRC/TAF function unit 44 to the external TE 6.

A transfer Link Control Protocol (LCP) of the PPP 444 includes a control function for informing the external TE 6 from the UE 4 of a state where IP header compression is stabilized.

The external TE 6 side includes a restoration function for restoring the original IP header from the IP address information of the basic IP header and so forth in a state in which the handshake of header compression is completed.

According to such an arrangement, the following advantages are obtained. (1) With downlink (DL), header restoration processing can be omitted at the L2 layer (PDCP) of LTE. (2) The data capacity of the header can be reduced, and data increase after escape processing (octet conversion) by the PPP 444 can be eased. (3) A compressed header packet can be communicated to a communication route from the L2 layer of LTE to the external TE 6, and transferred in a header compressed state, and accordingly, throughput can be improved. (4) The decoding processing of an IP header can be simplified at the external TE 6. (5) The above-mentioned advantages are obtained without accompanying significant increase in handshake (control command). Throughput as to substantial data (regions such as streaming data and so forth) can be improved.

Third Embodiment

FIG. 5 will be referenced regarding a third embodiment. FIG. 5 illustrates a configuration example of the communication system. The configuration example illustrated in FIG. 5 is an example, and the present disclosure is not restricted to this configuration. In FIG. 5, the same or common portions as those in FIGS. 3A and 3B are denoted with the same reference numerals.

The UE 4 illustrated in FIG. 5 is an example of the communication terminal (may be referred as the communication device) according to the present disclosure, and makes up a modem (signal conversion device). This UE 4 includes the CPU core 31, CPU core 32, shared memory 54, and external TE interface 56. This UE 4 includes an antenna 27 for receiving a wireless signal of a predetermined frequency, for example, 2 [GHz], 3 [GHz], or 3.9 [GHz] to be transmitted from the BS 22 (see FIGS. 3A and 3B).

The CPU core 31 is a function unit that takes care of various types of wireless portion side processing such as regeneration of packet data from radio signals, and makes up the above-mentioned LTE wireless function unit 42. With this LTE wireless function unit 42, the functions of the RoHC router function control module (master) 432 of the RoHC function unit 52 (FIG. 15), RoHC 421, and evRLC 422, and evMAC 423 are realized. A switch 430 is configured on the output side of this CPU core 31. This switch 430 is controlled by the RoHC router function control module 432, and the output according to the RoHC 421, and the output of the evRLC 422 are provided from this switch 430 to the shared memory 54. The RoHC router function control module 432 determines the state of the compressed header, and executes routing control. Specifically, the RoHC router function control module 432 switches the switch 430 according to the determination result thereof, and the switch 430 communicates the compressed header, or the restored header of the compressed header by the RoHC 421.

The shared memory 54 is a storage unit that is shared by the CPU core 31 and CPU core 32. This shared memory 54 may be configured of a recording medium such as a hard disk drive (HDD), semiconductor memory, or the like. The data received at the UE 4, and packet data such as the above-mentioned compressed header packet 50 to be communicated to the external TE 6 are stored in this shared memory 54. The data is transferred from the CPU core 31 to the CPU core 32 based on the handshake between the CPU cores 31 and 32 with the shared memory 54 as a medium.

The CPU core 32 takes care of cable side processing, and makes up the above-mentioned RRC/TAF function unit 44. This RRC/TAF function unit 44 realizes the functions of a RoHC router function module (slave) 448, a RoHC terminal function control module (master) 450 of the user plane (U-Plane) or user information transfer plane, and a RoHC router 452. The RoHC router function control module 448 has slave relationship as to the above-mentioned RoHC router function control module 432 that is the master. Based on the handshake between the CPU cores 31 and 32, the RoHC router function control modules 432 and 448 perform cooperative operations, but the RoHC router function control module 432 takes care of main driving, and the RoHC router function control module 448 is driven.

The RoHC terminal function control module 450 controls the transmission and reception of user data between the UE 4 and the external TE 6 or BS 22.

The RoHC router 452 makes up a transmission route that intervenes between the shared memory 54 and the USB processing function module 454, and performs data transfer to the external TE 6 side.

The output of the RoHC router 452 is passed to the USB processing function module 454, and output from the CPU core 32 to the external TE interface 56. The external TE interface 56 is a relay unit for connecting the UE 4 and the external TE 6 by cable. A USB physical layer (USB-PHY) 542 including a switch is provided to this external TE interface 56. This USB-PHY 542 is connected to the external TE 6 by a cable 28. Thus, the data received at the CPU core 31 side is transferred and provided to the external TE 6 as illustrated with an arrow X.

The external TE 6 is configured of a personal computer (PC), and receives the data transfer from the UE 4 connected thereto by cable. This external TE 6 includes USB 602, memory 604, driver 606, RoHC terminal function control module (slave) 608 of the U-Plane, and reception buffer 610.

Upon data transfer been received from the UE 4 connected to the USB interface 602 by cable, the data thereof is stored in the memory 604.

The RoHC terminal function control module 608 has slave relationship with the above-mentioned RoHC router terminal function control module 450 that is the master. Though the RoHC terminal function control modules 450 and 608 perform cooperative operations based on the handshake between the CPU core 32 and the external TE 6, the RoHC terminal function control module 450 takes care of main driving, and the RoHC terminal function control module 608 is driven. According to such master and slave relationship, the header packet stored in the memory 604 is subjected to RoHC termination processing, and the result thereof is provided to the driver 606.

The decoded IP header and payload in the reception buffer 610 are provided from the memory 604 to the TCP (UDP)/IP stack 463. In this case, Portable Operating System Interface-Application Programming Interface (POSIX-API) is employed as an interface, for example.

With such a configuration, U-Plane route control is executed by the RoHC 421 and RoHC router function control module 432 implemented on the CPU core 31 side, and the RoHC router function control module 448 and RoHC terminal function control module (master) 450 implemented on the CPU core 32 side. Thus, the U-Plane packet having the RoHC header 505 (see FIG. 4) is transferred to the external TE 6.

Figure 7:
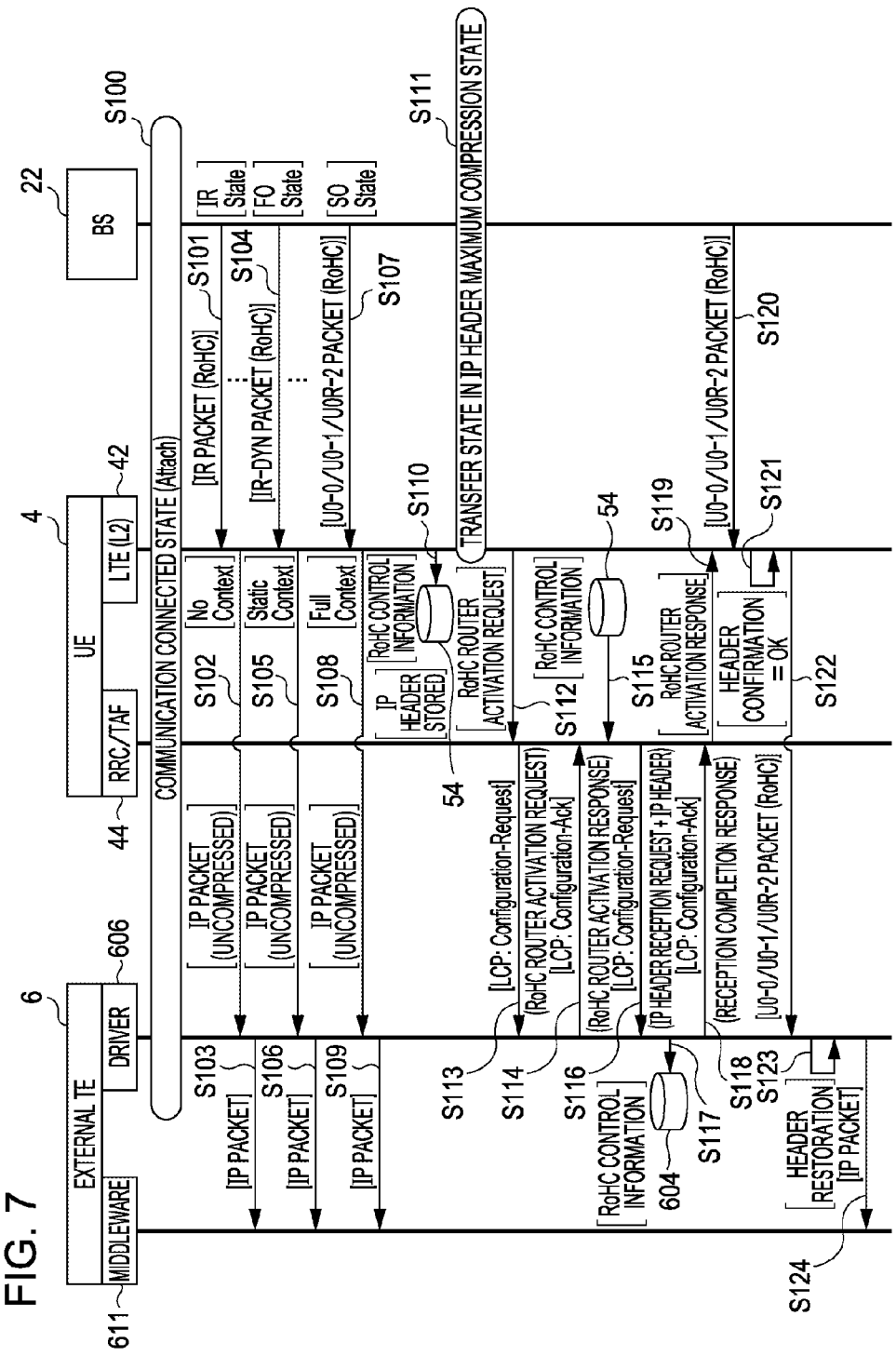
FIG. 7 is a diagram illustrating an example of an activation sequence.
Figure 9:
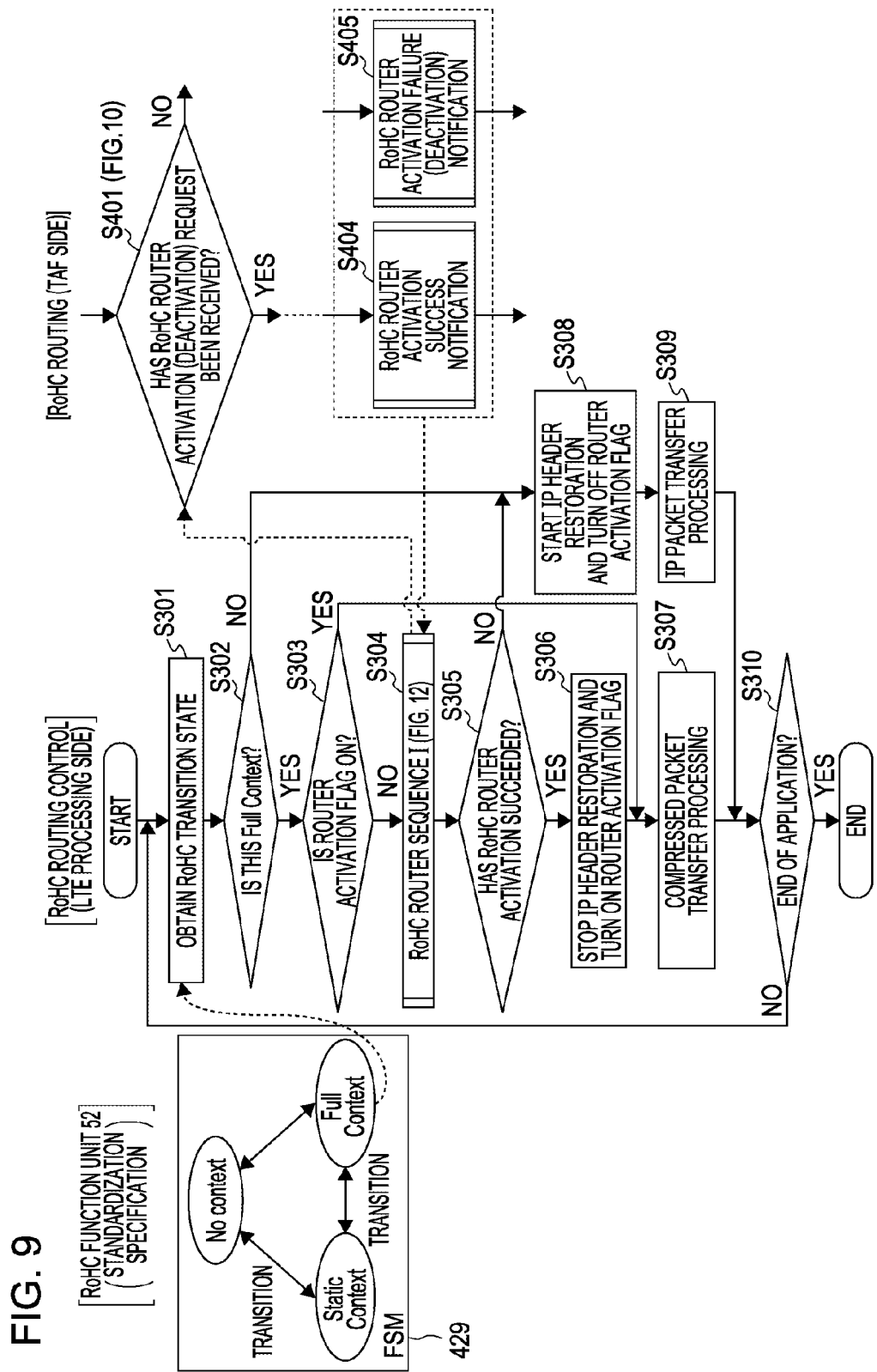
FIG. 9 is a flowchart illustrating an example of RoHC routing control (LTE function unit side processing)

With the UE 4 making up the modem, the RoHC router 452 is activated, and accordingly, the data transferred from the evPDCP layer serves as transfer of the RoHC header (compressed header packet) and payload. Accordingly, though the RoHC function to be used at the LTE wireless function unit 42 is loaded to the PDCP layer, decompression of the header of an IP packet does not have to be performed. A sequence for establishing such U-Plane path is as described later (FIGS. 7, 9, and so forth).

Figure 6:
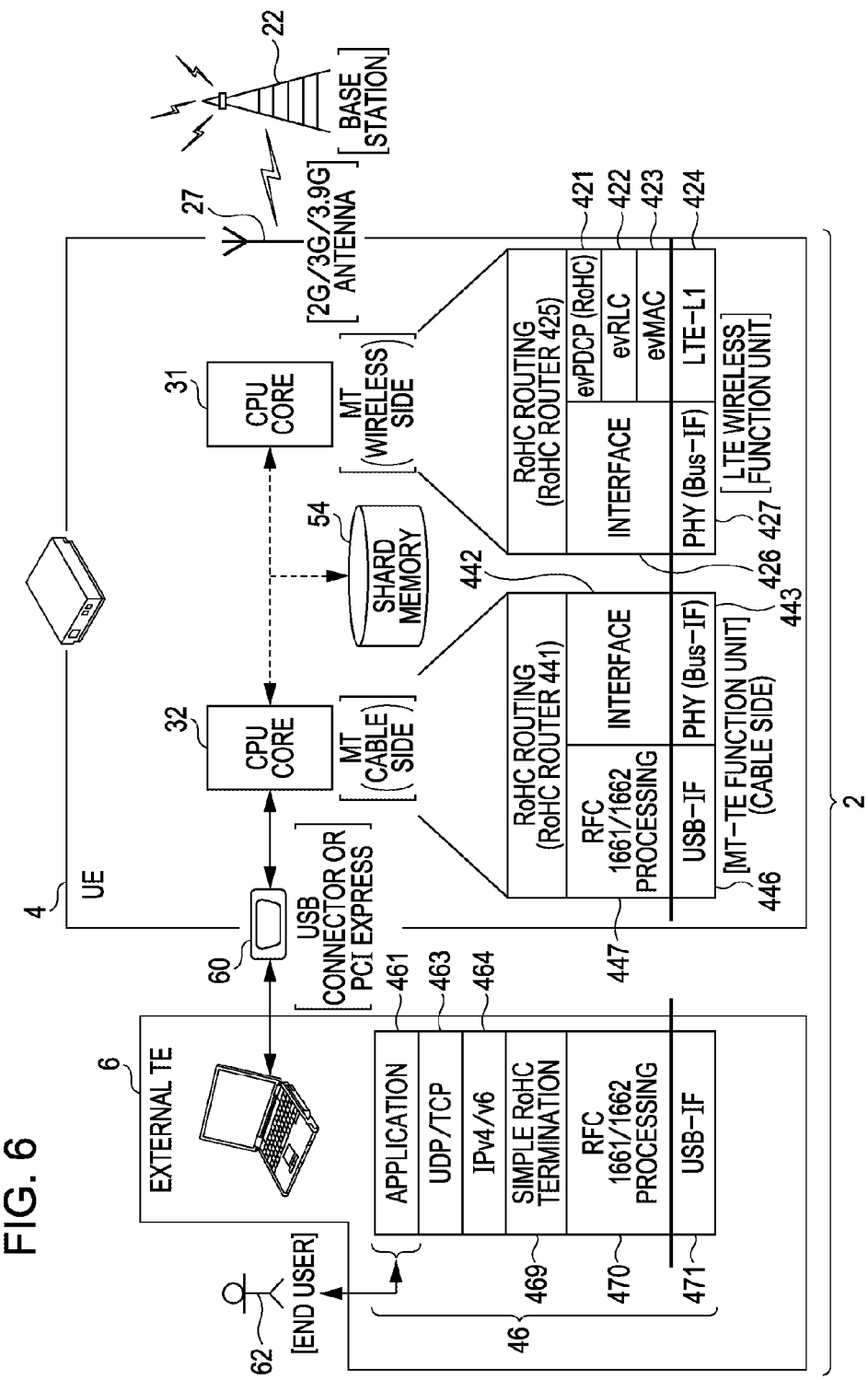
FIG. 6 is a diagram illustrating an example of a communication system and a protocol stack.

Next, FIG. 6 will be referenced regarding the communication system 2 and protocol stack. In FIG. 6, the same portions as with FIG. 5 are denoted with the same reference numerals.

With this communication system 2, the UE 4 makes up a modem for performing data reception from the BS 22, and data transmission from the external TE 6, and makes up a data card terminal, for example.

The protocols of the RoHC routing (processing of the RoHC router 425), evPDCP (RoHC) 421, evRLC 422, evMAC 423, LTE (-L1) 424, interface 426, and PHY (Bus-IF) 427 are loaded to the LTE wireless function unit 42 of this UE 4.

The protocols of the RoHC routing (processing of the RoHC router 441), interface 442, PHY (Bus-IF) 443, RFC 1661/1662 processing 447, and USB-IF 446 are loaded to the RRC/TAF function unit 44.

With the UE 4, an input/output unit (I/O) 60 is provided, the external TE 6 is connected thereto via this I/O 60. The input/output unit 60 is configured of a USB connector or Peripheral Component Interconnect (PCI).

The external TE 6 is configured of a host PC or modem. The application data 461, and the protocols of the UDP/TCP 463, IP (v4/v6) 464, simple RoHC terminal 469, RFC 1661/1662 processing 470, and USB-IF 471 are loaded to this external TE 6. The data provided by downlink is provided to an end user 62 by the application data 461. The data provided from the end user 62 to the application 461 is appended with the UDP header 503 and IP header 504, and these headers are compressed to the RoHC header 505. The data appended to this compressed header 505 is transferred from the external TE 6 to the UE 4.

Next, FIG. 7 will be referenced regarding an activation sequence. FIG. 7 illustrates an example of the activation sequence.

This activation sequence is an example of the data transfer method according to the present disclosure, and includes processing for transmitting the compressed header packet according to the RoHC to the external TE 6 using the RoHC routers 425 and 441. The sequence activation includes a function for performing a message response included in the sequence. Within the UE 4, an activation control message of the RoHC routers 425 and 441 between the LTE (L2) wireless function unit 42 and the RRC/TAF function unit 44 is employed. This RoHC router activation control message includes a RoHC activation or deactivation request, and a RoHC activation or deactivation response.

With this routing control, a message from the UE 4 informing the driver 606 of the external TE 6 about the control thereof is employed. This message may be added to the LCP option of the PPP 466. This message includes: a. Configuration-Request (RoHC router activation or deactivation request), b. Configuration-Ack (RoHC router activation or deactivation response), c. Configuration-Request (IP header reception request), and d. Configuration-Ack (reception completion response).

With the activation sequence illustrated in FIG. 7, the BS 22, the LTE (L2) wireless function unit 42 and RRC/TAF function unit 44 of the UE 4, and the driver 606 and middleware 611 of the external TE 6 are employed. The middleware 611 is software to be used for compression of a header, or decompression of a compressed header, and is positioned between the OS layer and the application layer.

The BS 22, UE 4, and external TE 6 are in a connected state by communication (Attach) (Operation S100). This activation sequence is started. The BS 22 has an initialized state (IR State: Initialization & Refresh State), a transition state (FO State: First Order State), or a stable state (SO State: Second Order State) according to communication situations.

With the IR State, an IR Packet (RoHC) that is a compressed packet is transferred from the BS 22 to the LTE (L2) wireless function unit 42 (Operation S101). With the IR State, there is no context (No Context), and this state is a case where there is no valid header information. In this case, an uncompressed IR packet is transferred from the LTE (L2) wireless function unit 42 to the driver 606 of the external TE 6 (Operation S102). The IP packet is transferred from this driver 606 to the middleware 611 of the external TE 6 (Operation S103).

With the FO State, the IR-DYN packet (RoHC) is transferred to the LTE (L2) wireless function unit 42 (Operation S104). This case is the case of Static Context, and is a case where updating of a dynamic (Dynamic) field has to be performed. In this case, the IP packet (uncompressed packet) is transferred from the LTE (L2) wireless function unit 42 to the driver 606 of the external TE 6 (Operation S105), and the IP packet is transferred from this driver 606 to the middleware 611 of the external TE 6 (Operation S106).

With the SO State, a UO-0, UO-1, or UOR-2 packet (RoHC) is transferred to the LTE (L2) wireless function unit 42 (Operation S107). This case is Full Context, and is a case where the entire field information has correctly been decoded. In this case, the IP packet (uncompressed packet) is transferred from the LTE (L2) wireless function unit 42 to the driver 606 of the external TE 6 (Operation S108). The IP packet is transferred from the driver 606 to the middleware 611 of the external TE 6 (Operation S109).

RoHC control information is issued from the LTE (L2) wireless function unit 42, and the IP header is saved in the shared memory 54 (Operation S110). Upon proceeding to a transfer state in the IP header maximum compressed state (Operation S111), a RoHC router activation request is issued from the LTE (L2) to the RRC/TAF 44 (Operation S112), and an LCP (Configuration-Request: RoHC router activation request) is transferred from the RRC/TAF 44 to the driver 606 (Operation S113). In response to this, an LCP (Configuration-Ack: RoHC router activation response) is transferred to the TAF 44 (Operation S114).

The RoHC control information stored in the shard memory 54 is issued from the LTE (L2) wireless function unit 42 to the RRC/TAF 44 (Operation S115). An LCP (Configuration-Request: IP header reception request+IP header) is transferred from the TAF 44 to the driver 606 (Operation S116), and the RoHC control information is stored in the memory 604 of the external TE 6 (Operation S117). A Configuration-Ack (reception completion response) is transferred from the driver 606 to the TAF 44 (Operation S118), and a RoHC router activation response is transferred from the RRC/TAF 44 to the LTE (L2) wireless function unit 42 (Operation S119).

A UO-0, UO-1, or UOR-2 packet (RoHC) is transferred from the BS 22 to the LTE (L2) wireless function unit 42 (Operation S120), and header confirmation is performed at the LTE (L2) wireless function unit 42 (Operation S121). If the result of the header confirmation is OK, a UO-0, UO-1, or UOR-2 packet (RoHC) is transferred from the LTE (L2) wireless function unit 42 to the driver 606 (Operation S122). At the driver 606, header restoration is executed (Operation S123), and the IP packet is passed to the middleware 611 (Operation S124).

In this way, at the L2 layer of the LTE function unit 42, an IP packet to which an uncompressed header is appended is transmitted to the external TE 6 until the RoHC becomes a Full Context state (maximum compressed state). An activation request for the RoHC router 465 is then transmitted to the external TE 6 side in the maximally compressed state (Full Context), and handshake is started.

Figure 8:
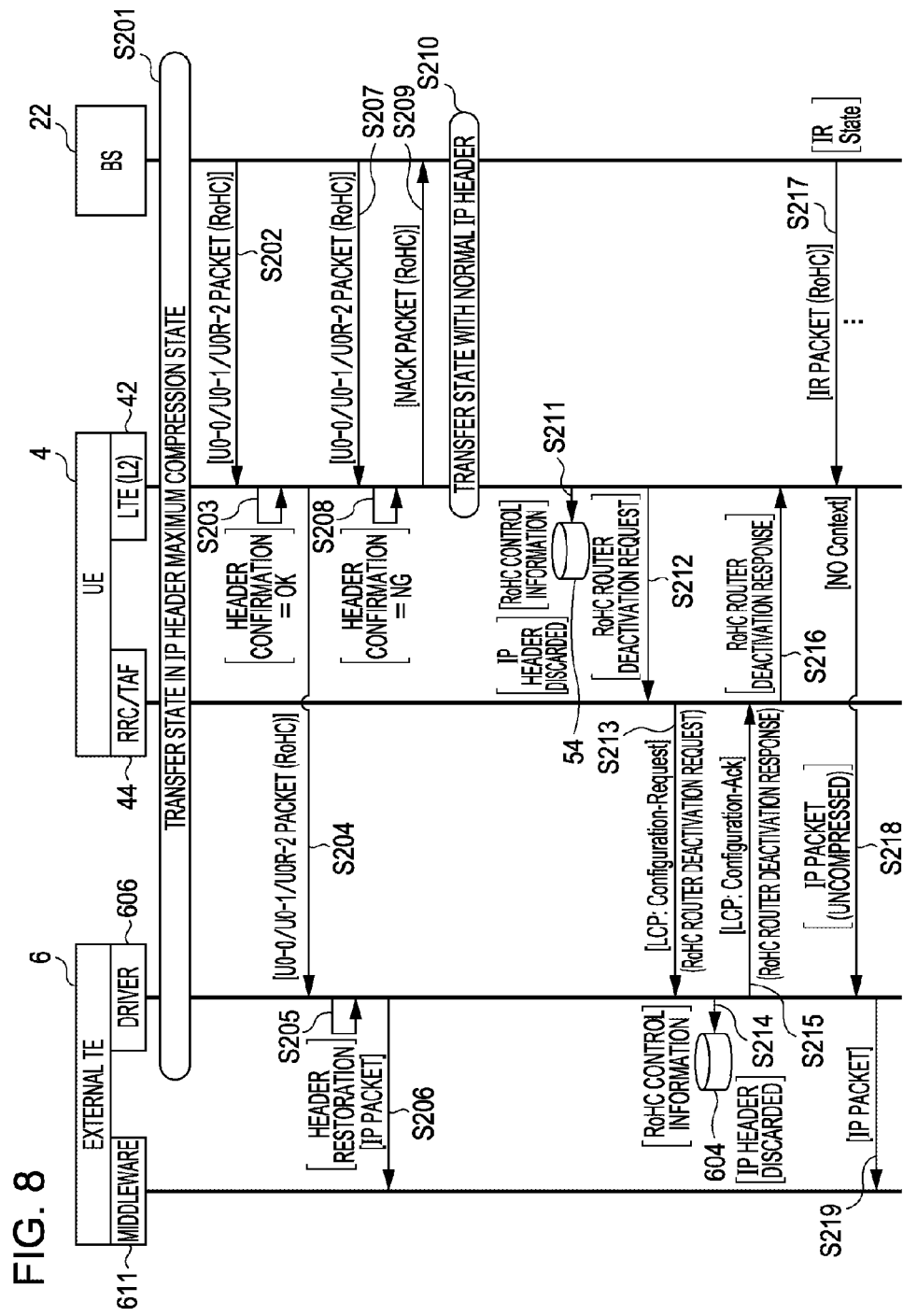
FIG. 8 is a diagram illustrating an example of the release sequence of compressed packet transfer.

Next, FIG. 8 will be referenced regarding the release processing of compressed packet transfer. FIG. 8 illustrates a processing sequence for releasing compressed packet transfer.

The processing sequence illustrated in FIG. 8 is an example of the data transfer method according to the present disclosure, and in the event of having detected an error such as NG in a cyclic redundancy check (CRC) function or the like, the LTE function unit 42 determines this to be NG in the RoHC processing, and releases the RoHC processing of the BS 22 at the L2 layer (PDCP layer in the case of LTE). Simultaneously with release, a RoHC router deactivation request is transmitted to the external TE 6 side, and RoHC restoration at the external TE 6 is stopped. That is to say, the LTE function unit 42 executes a processing sequence for releasing compressed packet transfer.

With the processing sequence illustrated in FIG. 8, in the event that the BS 22, UE 4, and external TE 6 are in a transfer state in the IP header maximum compressed state (Operation S201), a UO-0, UO-1, or UOR-2 packet (RoHC) is transferred from the BS 22 to the LTE (L2) wireless function unit 42 (Operation S202). At the LTE (L2) wireless function unit 42, header confirmation is performed (Operation S203), and in the event that the result of the header confirmation is OK, a UO-0, UO-1, or UOR-2 packet (RoHC) is transferred from the LTE (L2) wireless function unit 42 to the driver 606 (Operation S204). At the driver 606, header restoration is executed (Operation S205), and the IP packet is provided to the middleware 611 (Operation S206).

On the other hand, a UO-0, UO-1, or UOR-2 packet (RoHC) is transferred from the BS 22 (Operation S207), and as a result of the LTE (L2) wireless function unit 42 having performed header confirmation (Operation S208), there may be a case of NG. In this case, a NACK packet (RoHC) is transferred from the LTE (L2) wireless function unit 42 to the BS 22 (Operation S209). Thus, transition is made to a transfer state with a normal IP header even between the BS 22 and the UE 4 (Operation S210).

Upon proceeding to a transfer state with a normal IP header, the LTE (L2) wireless function unit 42 discards the IP header in the shared memory 54 where the RoHC control information is stored (Operation S211), and issues a RoHC router deactivation request to the TAF 44 (Operation S212). The TAF 44 transfers an LCP (Configuration-Request: RoHC router deactivation request) to the driver 606 (Operation S213). In response to this, the driver 606 discards the IP header in the memory 604 where the RoHC control information is stored (Operation S214), and transfers an LCP (Configuration-Ack: RoHC router deactivation response) to the RRC/TAF function unit 44 (Operation S215). The RRC/TAF function unit 44 which has received this transfers a RoHC deactivation response to the LTE (L2) wireless function unit 42 (Operation S216).

The BS 22 side that has proceeded to the IR State transfers the IR packet (RoHC) to the LTE (L2) wireless function unit 42 of the UE 4 (Operation S217). In the case of this no context, an uncompressed IP packet is transferred from the LTE (L2) wireless function unit 42 to the driver 606 of the external TE 6 (Operation S218), and the IP packet is transferred from the driver 606 to the middleware 611 of the external TE 6 (Operation S219).

Figure 10:
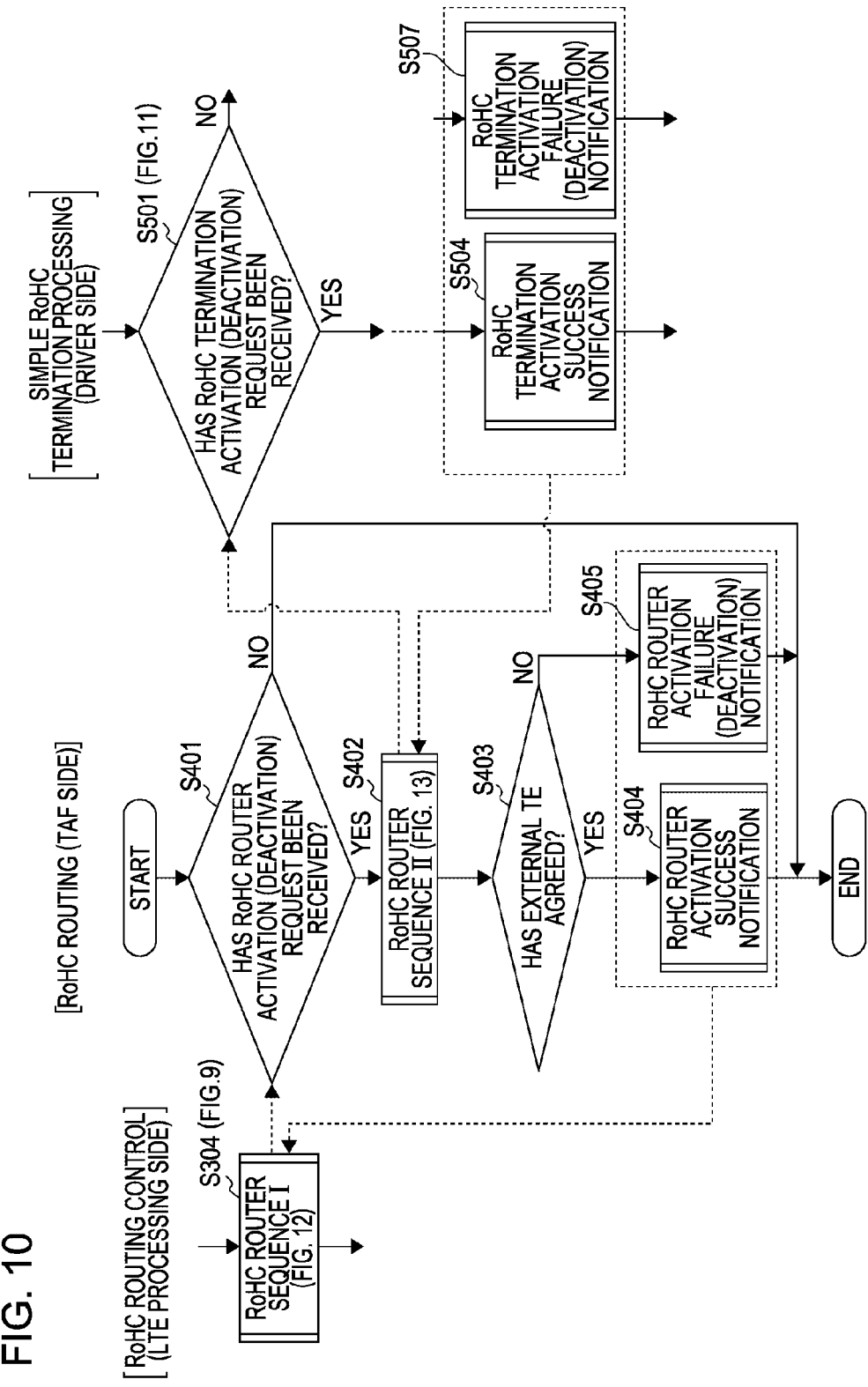
FIG. 10 is a flowchart illustrating an example of RoHC routing control (RRC/TAF function unit side processing)
Figure 11:
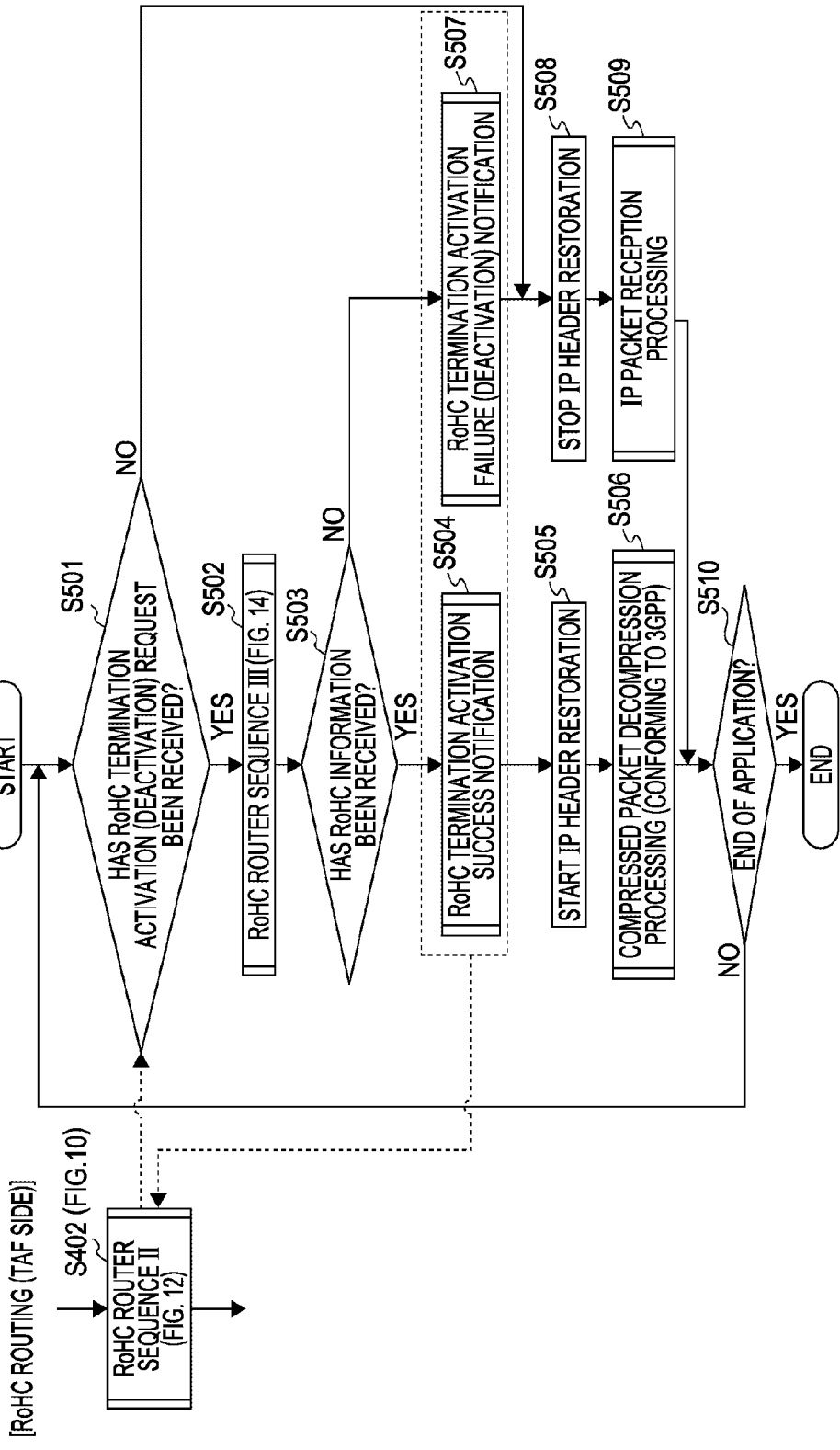
FIG. 11 is a flowchart illustrating an example of simple RoHC termination processing.

Next, FIGS. 9, 10, and 11 will be referenced regarding function control modules such as the RoHC router 425 and so forth. FIG. 9 illustrates a flowchart of the RoHC routing control (LTE processing side). FIG. 10 illustrates a flowchart of the RoHC routing (TAF side). FIG. 11 illustrates a flowchart of the simple RoHC termination processing (driver side).

RoHC Routing Control (Processing on LTE Function Unit 42 Side)

The processing procedure illustrated in FIG. 9 is an example of a data transfer method according to the preset disclosure, and is processing on the LTE function unit 42 side. Upon starting this processing procedure, a RoHC transition state is obtained (Operation S301). This RoHC transition state is executed by polling from a finite state machine (FSM) in the RoHC router function control module 432. The RoHC transition state includes three states of no context (No Context), static context (Static Context), and full context (Full Context), and one state of these is obtained.

Determination is made whether the RoHC transition state is full context (Operation S302), and if full context (YES in Operation S302), determination is made whether or not a router activation flag is on (ON) (Operation S303). In the event that the router activation flag is not on (NO in Operation S303), a RoHC router control sequence I (FIG. 12) is executed (Operation S304). This RoHC control sequence I (Operation S304) is in conjunction with Operation S401 (FIG. 10) of the RoHC routing on the TAF side, and is also in conjunction with Operations S404 and S405 (FIG. 10) of the RoHC routing on the TAF side.

Figure 12:
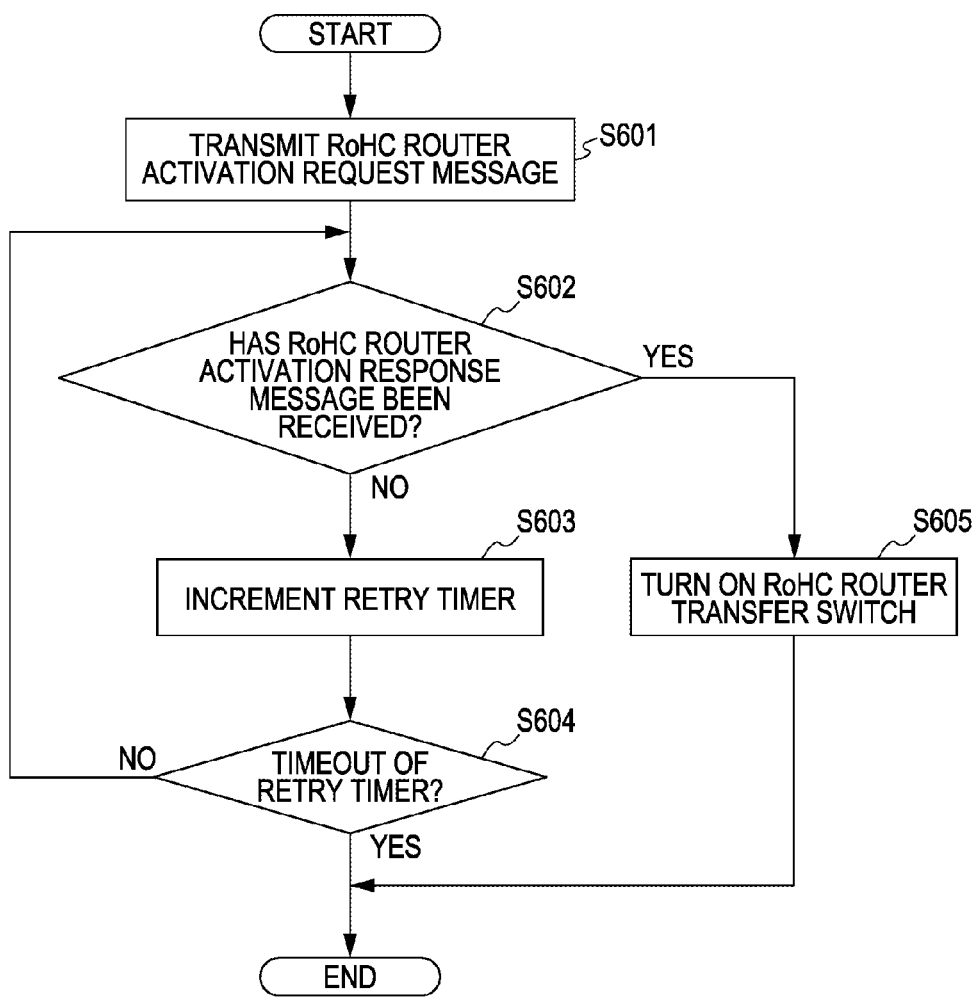
FIG. 12 is a flowchart illustrating an example of RoHC routing control (LTE function unit side processing)

After the processing of the RoHC router control sequence I (Operation S304: FIG. 12), determination is made whether or not activation of the RoHC router has succeeded (Operation S305). In the event that activation of the RoHC router has succeeded (YES in Operation S305), IP header restoration is deactivated (OFF), and turning on of the router activation flag is performed (Operation S306). In this case, the compressed packet transfer processing is executed (Operation S307).

In the event that the RoHC transition state is not full context in Operation S302 (NO in Operation S302), IP header restoration is performed (ON), and the router activation flag is turned off (Operation S308). In this case, though the IP packet transfer processing is executed (Operation S309), the compressed packet transfer processing is not performed.

In the event that the router activation flag is on in Operation S303 (YES in Operation S303), the compressed packet transfer processing is performed (Operation S307).

Also, in the event that activation of the RoHC router has failed in Operation S305 (NO in Operation S305), the sequence proceeds to Operation S308, and the same processing (Operations S308 and S309) as with a case other than full context is executed.

After such processing, determination is made whether or not the application has ended (Operation S310), and in the event that the application has not ended (NO in Operation S310), the sequence returns to Operation S301. Accordingly, such processing is repeatedly executed until the application has ended, and according to the end of the application (YES in Operation S310), this processing is ended.

RoHC Routing (Processing on RRC/TAF Function Unit 44 Side)

The processing procedure illustrated in FIG. 10 is an example of the data transfer method according to the present disclosure, and is processing on the RRC/TAF function unit 44 side. Upon starting this processing procedure, determination is made whether or not there has been a RoHC router activation (deactivation) request (Operation S401). In the event that there has been a RoHC router activation (deactivation) request (YES in Operation S401), a RoHC router control sequence II (FIG. 13) is executed (Operation S402). In the event that there has been no RoHC router activation (deactivation) request (NO in Operation S401), this processing is ended. This RoHC router control sequence II is in conjunction with Operations S501, S504, and S507 (FIG. 11) on the driver 606 side.

In the event of having executed the RoHC router control sequence II, determination is made whether or not the external TE 6 has agreed with the request (Operation S403). In the event that the external TE has agreed with the request (YES in Operation S403), an activation success notification of the RoHC router is issued (Operation S404), and this processing is ended.

Also, in the event that the external TE has not agreed with the request (NO in Operation S403), an activation failure (deactivation) notification of the RoHC router is issued (Operation S405), and this processing is ended.

Simple RoHC Termination Processing (Processing on Driver 606 Side)

The processing procedure illustrated in FIG. 11 is an example of the data transfer method according to the present disclosure, and is processing of the simple RoHC termination processing (driver side). Upon starting this processing procedure, determination is made whether or not there has been a RoHC termination activation (deactivation) request (Operation S501). In the event that there has been a RoHC termination activation (deactivation) request (YES in Operation S501), a RoHC router control sequence III (FIG. 14) is executed (Operation S502). In the event that there has been no RoHC router termination activation (deactivation) request (NO in Operation S501), the sequence proceeds to Operation S508.

In the event of having executed the RoHC router control sequence III (FIG. 14), determination is made whether or not the RoHC information has been received (Operation S503). In the event that the RoHC information has been received (YES in Operation S503), a RoHC termination activation success notification is issued (Operation S504), IP header restoration processing (ON) is started (Operation S505), and compressed packet decompression processing (conforming to 3GPP) is executed (Operation S506).

In the event that no RoHC information has been received (NO in Operation S503), a RoHC termination activation failure (deactivation) notification is issued (Operation S507), and the IP header restoration processing is deactivated (OFF) (Operation S508). In this case, IP packet reception processing is performed (Operation S509).

After the compressed packet decompression processing (Operation S506) or IP packet reception processing (Operation S509), determination is made whether or not the application is completed (Operation S510). In the event that the application is not completed (NO in Operation S510), the sequence returns to Operation S501, and the above-mentioned processing is continued until the application is completed. In the event that the application is completed (YES in Operation S510), this processing is ended.

RoHC Router Control Sequence I

With the RoHC router control sequence I, in the event there has been no response from the RoHC router function control module (slave) side, the RoHC router is not activated after elapse of a certain period of time, and the processing is completed.

Upon starting this RoHC router control sequence I, as illustrated in FIG. 12, a RoHC router activation request message is transmitted (Operation S601), and determination is made whether or not the RoHC router activation response message has been received (Operation S602).

In the event that no RoHC router activation response message has been received (NO in Operation S602), the sequence proceeds to retry processing, the RoHC router activation response message is monitored during a certain period of time, and a retry timer is incremented (Operation S603). The time-out of the retry timer is monitored (Operation S604), and reception of the RoHC router activation response message is monitored until the retry timer times out (Operation S602). In the event that the retry timer times out (YES in Operation S604), this processing is ended.

In the event that the RoHC router activation response message has been received (YES in Operation S602), the transfer switch for RoHC router is turned on (Operation S605), and this processing is ended.

RoHC Router Control Sequence II

With the RoHC router control sequence II, the processing is ended in a stage where the timer lapses, no response is transmitted to the RoHC control unit on the LTE side, and the RoHC router is not activated.

Figure 13:
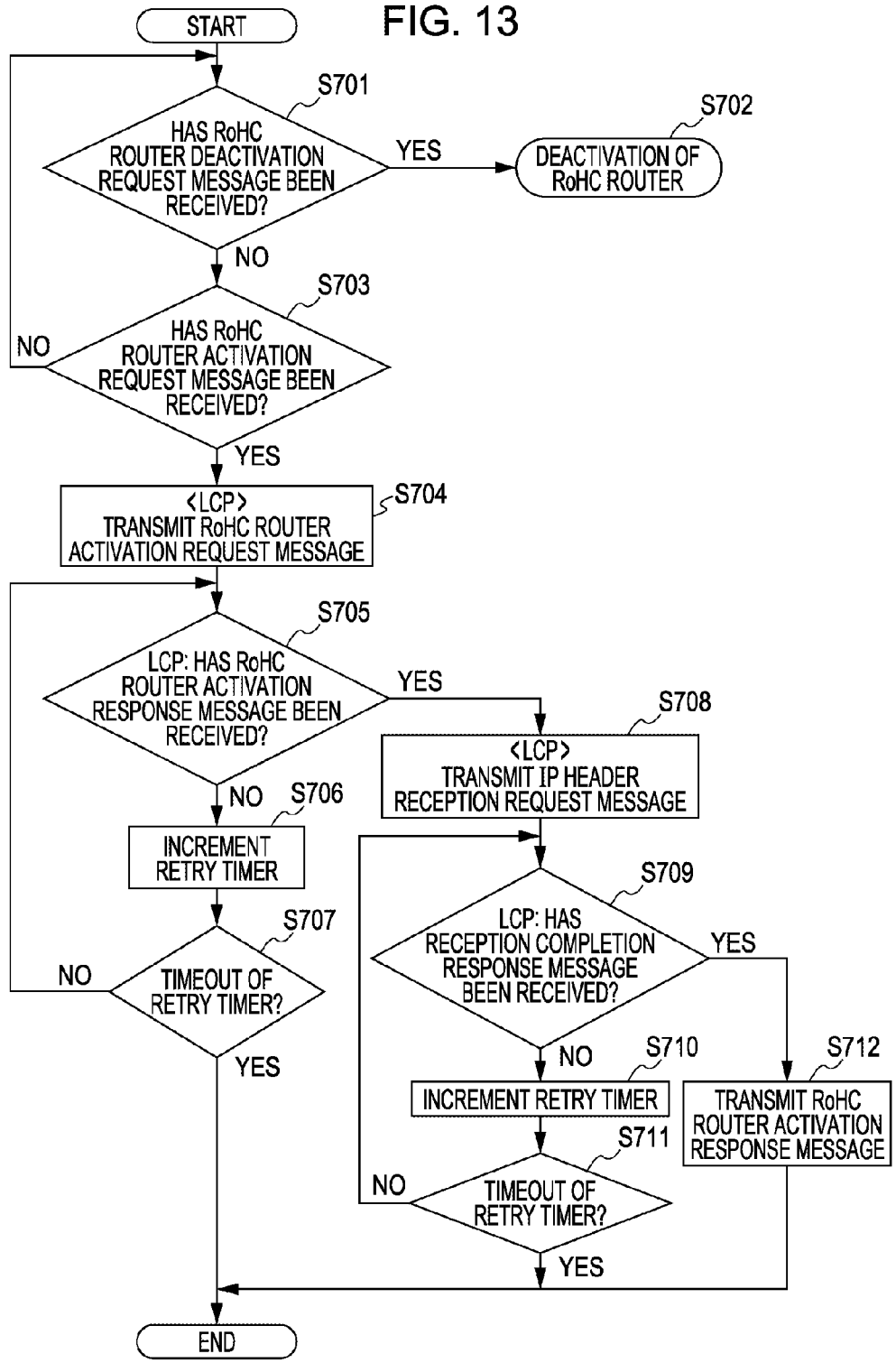
FIG. 13 is a flowchart illustrating an example of RoHC routing control (RRC/TAF function unit side processing)

Upon starting this RoHC router control sequence II, as illustrated in FIG. 13, determination is made whether or not the RoHC router deactivation request message has been received (Operation S701). In the event that the RoHC router deactivation request message has been received (YES in Operation S701), the RoHC router is deactivated (Operation S702).

In the event that the RoHC router deactivation request message has not been received (NO in Operation S701), determination is made whether or not the RoHC router activation request message has been received (Operation S703). In the event that the RoHC router activation request message has not been received (NO in Operation S703), the sequence returns to Operation S701, monitoring of reception of the RoHC router deactivation request message (Operation S701), and determination regarding reception of the RoHC router activation request message (Operation S703) are performed.

In the event that the RoHC router activation request message has been received (YES in Operation S703), the RoHC router activation request message is transmitted as LCP (Configuration-Ack: RoHC router activation response) (Operation S704). Determination is made whether or not LCP: the RoHC router activation response message has been received (Operation S705), and in the event that the RoHC router activation response message has not been received (NO in Operation S705), the retry timer is incremented (Operation S706). The timeout of the retry timer is monitored (Operation S707), and elapse of a predetermined period of time, i.e., reception of the RoHC router activation response message is monitored until the retry timer times out (Operation S705). In the event that a predetermined period of time has elapsed, and the RoHC router activation response message has not been received during the predetermined period of time thereof (YES in Operation S707), this processing is ended.

In the event that the RoHC router activation response message has been received (YES in Operation S705), LCP: the IP header reception request message is transmitted (Operation S708). Determination is made whether or not LCP: the reception completion response message has been received (Operation S709), and in the event that the reception completion response message has not been received (NO in Operation S709), the retry timer is incremented (Operation S710). The timeout of the retry timer is monitored (Operation S711), and elapse of a predetermined period of time, i.e., reception of the reception completion response message is monitored until the retry timer times out (Operation S709). In the event that a predetermined period of time has elapsed, and the reception completion response message has not been received during the predetermined period of time thereof (YES in Operation S711), this processing is ended.

In the event that the reception completion response message has been received (YES in Operation S709), the RoHC router activation response message is transmitted (Operation S712), and this processing is ended.

RoHC Router Control Sequence III

With the RoHC router control sequence III, in the event that no response has been received, the processing is ended in a stage where the timer lapses, no response is transmitted to the RoHC routing unit on the TAF side, and the RoHC router is not activated.

Figure 14:
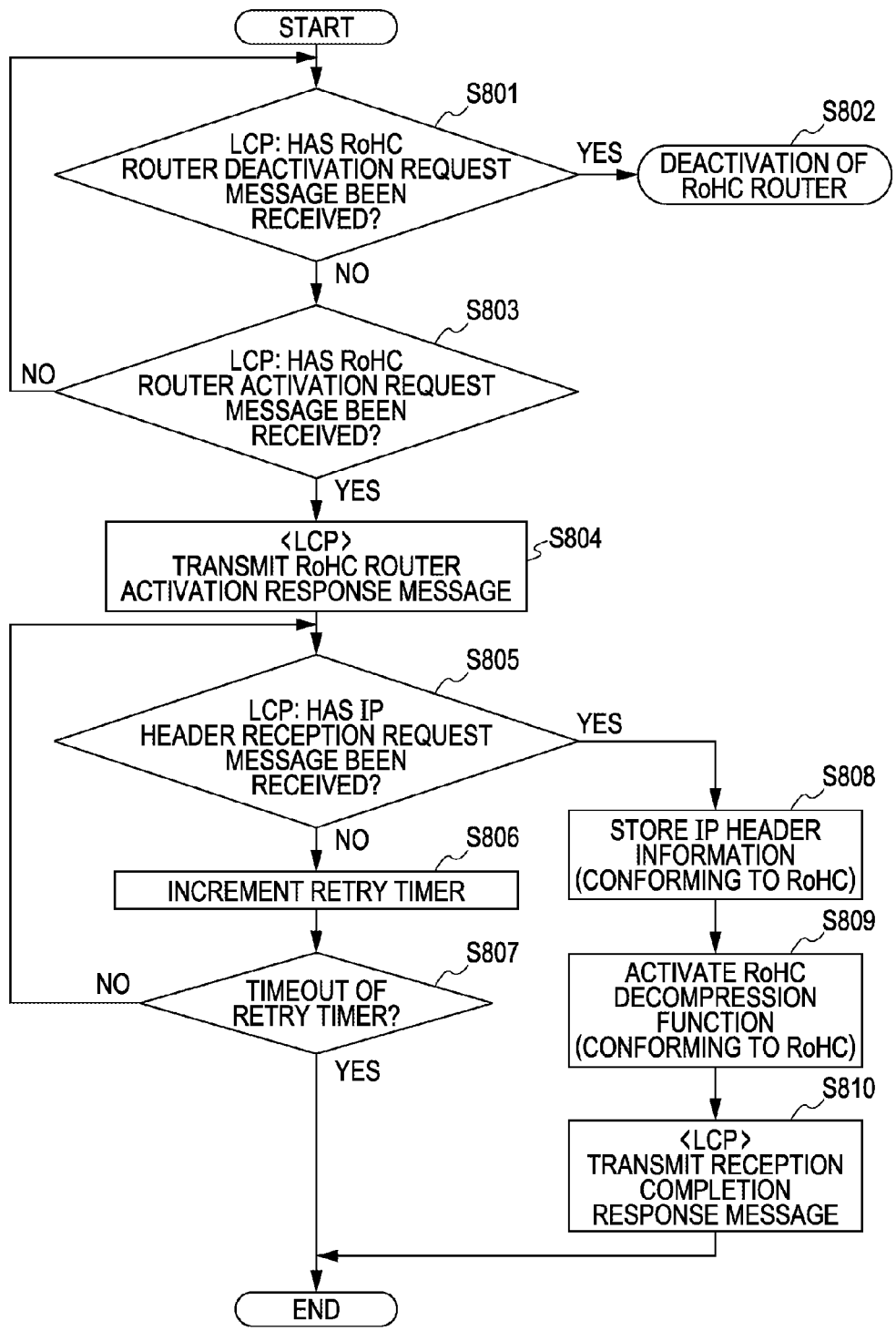
FIG. 14 is a flowchart illustrating an example of RoHC routing control (external TE driver side processing)

Upon starting this RoHC router control sequence III, as illustrated in FIG. 14, determination is made whether or not LCP: the RoHC router deactivation request message has been received (Operation S801). In the event that the RoHC router deactivation request message has been received (YES in Operation S801), the RoHC router is deactivated (Operation S802).

In the event that the RoHC router deactivation request message has not been received (NO in Operation S801), determination is made whether or not LCP: the RoHC router activation request message has been received (Operation S803). In the event that the RoHC router activation request message has not been received (NO in Operation S803), the sequence returns to Operation S801, and reception of the RoHC router deactivation request message or RoHC router activation request message is monitored (Operations S801 and S803).

In the event that the RoHC router activation request message has been received (YES in Operation S803), <LCP> the RoHC router activation response message is transmitted (Operation S804). After this transmission, determination is made whether or not LCP: the IP header reception request message has been received (Operation S805).

In the event that LCP: the IP header reception request message has not been received (NO in Operation S805), the retry timer is incremented (Operation S806). The timeout of the retry timer is monitored (Operation S807), and elapse of a predetermined period of time, i.e., reception of the IP header reception request message is monitored until the retry timer times out (Operation S805). In the event that a predetermined period of time has elapsed, and the IP header reception request message has not been received during the predetermined period of time thereof (YES in Operation S807), this processing is ended.

In the event that LCP: the IP header reception request message has been received (YES in Operation S805), the IP header information is saved (conforming to RoHC) (Operation S808). The RoHC decompression function is activated (conforming to RoHC) (Operation S809), <LCP> reception completion response message is transmitted (Operation S810), and this processing is ended. Data Transfer of RoHC Router 452 (In Case of RoHC Router 452 Being off)

Figure 15:
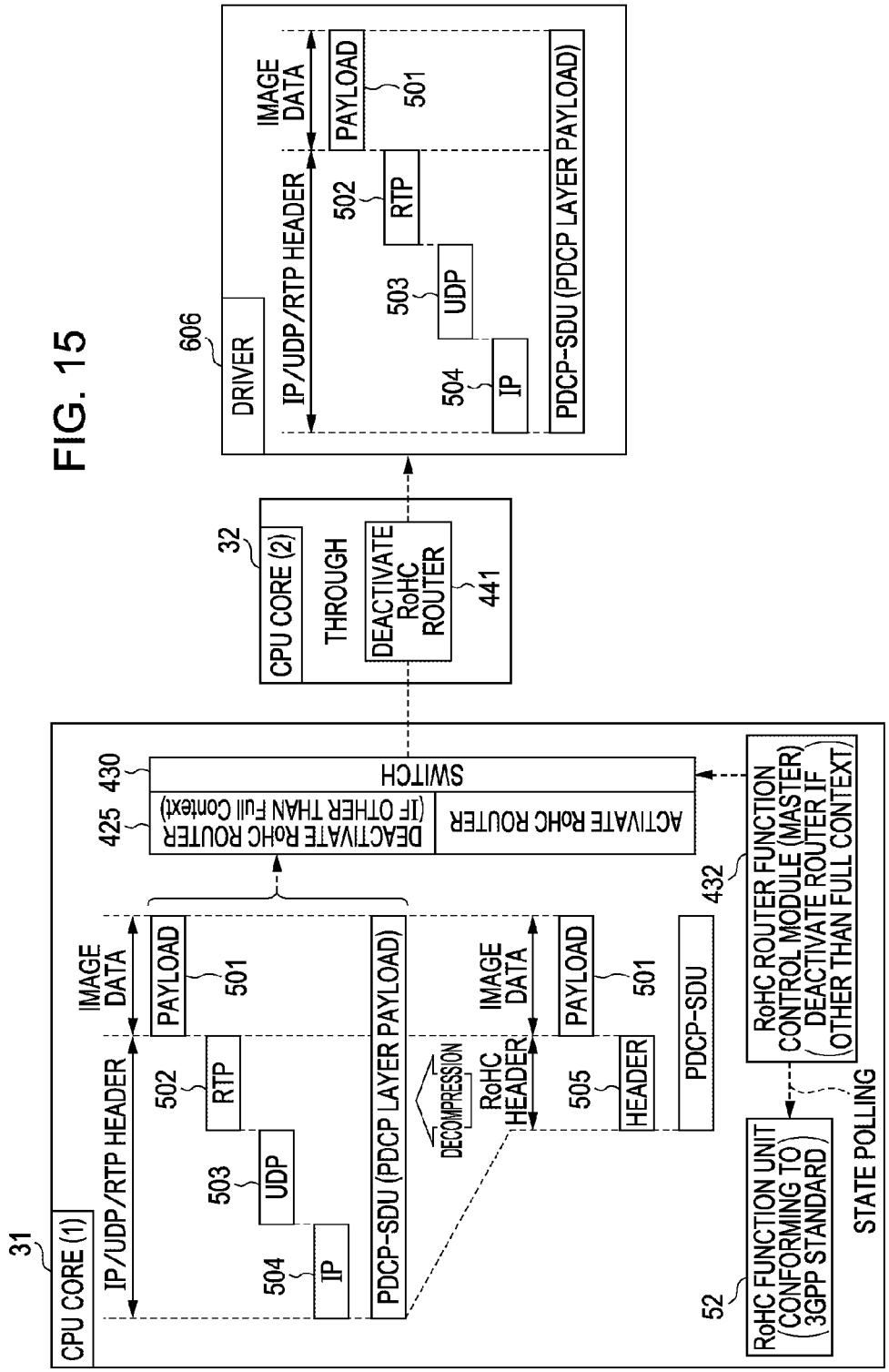
FIG. 15 is a diagram illustrating a data transfer example from a communication terminal to an external TE (in the case of deactivating a RoHC router)

FIG. 15 will be referenced regarding data transfer in the case that the RoHC router is deactivated. FIG. 15 illustrates a data transfer example of the RoHC router.

With downlink (DL), data is transferred from the UE 4 to the external TE 6. At the CPU core 31 of the UE 4, the RoHC function control module (master) 432 carries out status polling as to the RoHC function unit (conforming to 3GPP standard) 52, and in a case other than full context, the RoHC router 425 is switched to deactivation (off).

In the event that the RoHC router 425 is off, at the CPU core 31, the RoHC header 505 is subjected to compressed header decompression processing with PDCP-SUD (PDCP layer payload). That is to say, the RoHC header 505 that is a compressed header is decompressed to an IP header, a UPD header, and an RTP header. Therefore, the decompressed RoHC header 505 is structured of a payload 501 to which the IP header 504, UPD header 503, and RTP header 502 are appended. The payload 501 is image data, for example.

The switch 430 communicates the payload 501 (image data) to which the IP header 504, UPD header 503, and RTP header 502 are appended since the RoHC router 425 is off, and transfers the payload to the CPU core 32. The RoHC router 441 on the CPU core 32 side is turned off in conjunction with turning off of the RoHC router 425 on the CPU core 31 side. Therefore, the CPU core 32 is in a through state as to data transfer, and the image data to which the IP header 504, UPD header 503, and RTP header 502 are appended is transferred to the driver 606 of the external TE 6 without change. Data Transfer of RoHC Router 452 (in Case of RoHC Router 452 being on)

Figure 16:
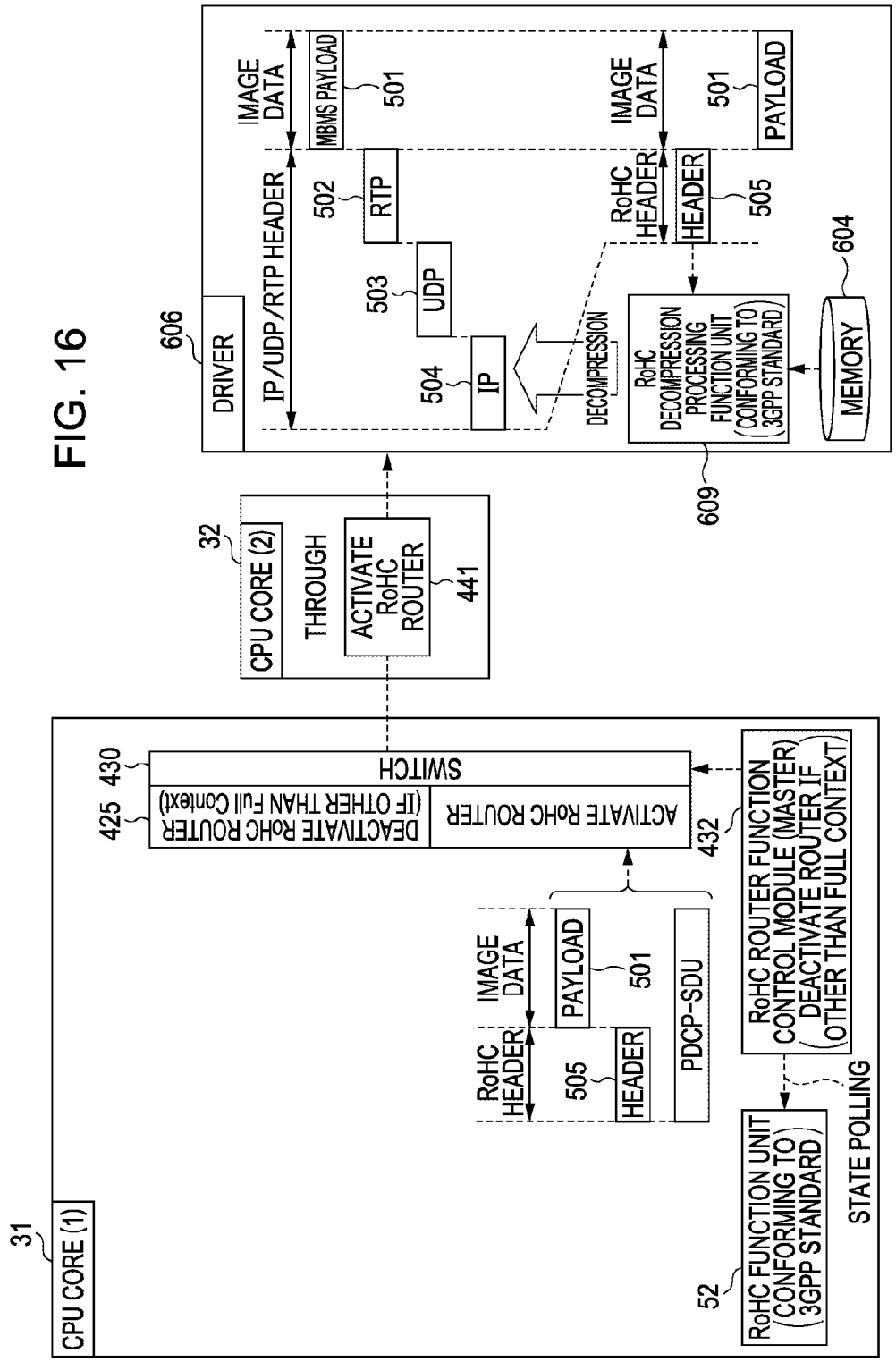
FIG. 16 is a diagram illustrating a data transfer example from a communication terminal to an external TE (in the case of activating the RoHC router)

FIG. 16 will be referenced regarding data transfer in the case that the RoHC router 425 is on. FIG. 16 illustrates a data transfer example of the RoHC router. In FIG. 16, the same portions as with FIG. 15 are denoted with the same reference numerals.

With downlink (DL), it is as described above that data is transferred from the UE 4 to the external TE 6. At the CPU core 31 of the UE 4, the RoHC function control module (master) 432 carries out status polling as to the RoHC function unit (conforming to 3GPP standard) 52, and in the event of full context, the RoHC router 425 is turned on.

In the event that the RoHC router 425 is on, the CPU core 31 deactivates the decompression processing of the RoHC header 505 that is compressed header. That is to say, the RoHC header 505 is kept as it is. In this case, the data is structured of the payload 501 to which the RoHC header 505 is appended. In this case, the payload is image data, for example.

The switch 430 communicates the image data to which the RoHC header 505 is appended since the RoHC router 425 is on, and transfers the image data to the CPU core 32. The RoHC router 441 on the CPU core 32 side is turned on in conjunction with turning on of the RoHC router 425 on the CPU core 31 side. Therefore, the CPU core 32 is in a through state as to data transfer, and the image data (payload 501) to which the RoHC header 505 is appended is transferred to the driver 606 of the external TE 6 without change.

At the driver 606 to which the RoHC header 505 and payload 501 have been provided, a RoHC decompression processing function unit 609 decompresses the RoHC header 505 to an IP header, UPD header, and RTP header.

In this way, in the event that the RoHC router 425 is on, the switch 430 is switched, the RoHC function unit 52 on the LTE function unit 42 side deactivates decompression of the RoHC header 505 that is a compressed header. The RoHC header 505 that is a compressed header is transferred to the driver 606 without change. The driver 606 carries out only decompression with the full context of the RoHC header 505. The decompression processing of the RoHC header 505 conforms to the RoHC standard. In this case, the header information is the entire header information such as an IP header, UDP header, RTP header, and so forth to be stored with normal RoHC.

Hardware Configuration

Figure 17:
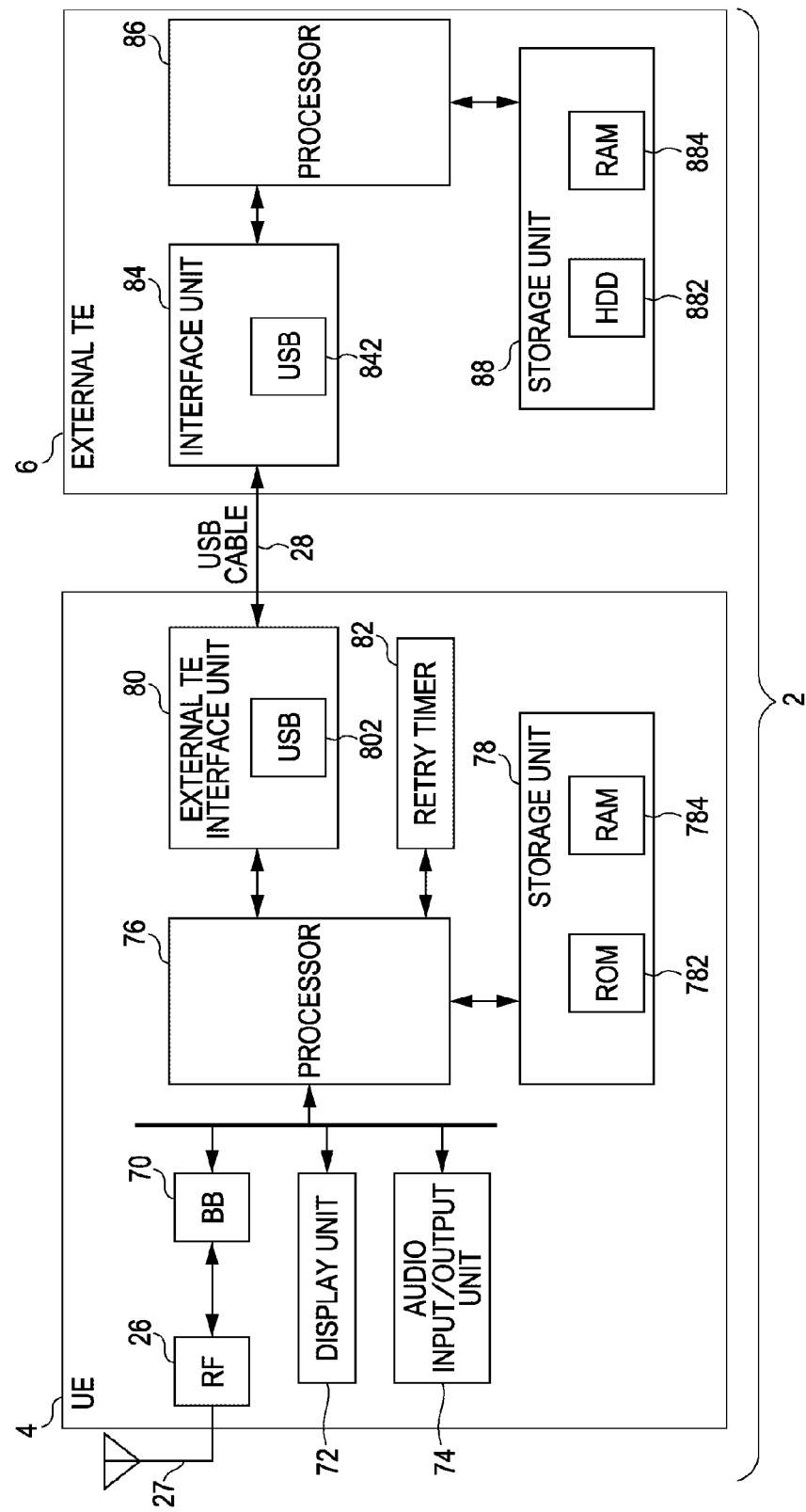
FIG. 17 is a diagram illustrating an example of the hardware of a UE or external TE.

FIG. 17 will be referenced regarding the hardware of the communication system 2. FIG. 17 illustrates an example of the hardware of the communication system 2. In FIG. 17, the same portions as those in FIGS. 3A and 3B are denoted with the same reference numerals.

With the communication system 2 illustrated in FIG. 17, the UE 4 is configured of, for example, a cellular phone, the external TE 6 is configured of a PC, and these are connected by cable using the USB cable 28.

The UE 4 includes an LTE wireless (RF) unit 26, a baseband processing (BB) unit 70, a display unit 72, an audio input/output unit 74, a processor 76, a storage unit 78, and an external TE interface unit 80, and makes up a modem which transmits or receives the above-mentioned packet data.

The RF unit 26 includes an antenna 27 for transmission and reception, and performs transmission or reception of wireless waves as to the base stations such as the above-mentioned BS 22 and so forth. The BB unit 70 is controlled by the processor 76, modulates carrier signals using data signals and audio signals, or demodulates the data signals and audio signals from the reception signals of the RF unit 26. The display unit 72 is configured of, for example, an LCD (Liquid Crystal Display), and presents transmission data and reception data as information such as visible letters, symbols, and so forth. The audio input/output unit 74 performs input processing of the audio signals from a microphone, and plays the audio signals demodulated from the reception signals as audio.

The processor 76 executes an operating system (OS) or application program stored in the storage unit 78, and realizes the above-mentioned packet communication method. This processor 76 is configured of the above-mentioned CPU cores 31 and 32. The storage unit 58 includes a read-only memory (ROM) 782 and a random-access memory (RAM) 784, and makes up a program storage unit or data storage unit. The above-mentioned OS and a program for realizing the packet communication method are stored in the program storage unit. The RAM 784 is used for storage of received packet data, and for a work area. The above-mentioned shard memory 54 is configured of this storage unit 78. This storage unit 78 is configured of a recording medium such as semiconductor memory such as flash ROM or the like. A retry timer 82 that monitors various processing time is connected to the processor 76.

The external TE interface unit 80 is a connection unit as to an external device, and includes, for example, the USB input/output unit 802, and this USB input/output unit 802 is connected to the external TE 6 via the USB cable 28.

The external TE 6 is an example of a data terminal device or packet processing device, and is configured of a PC or modem. The external TE 6 illustrated in FIG. 17 includes an interface unit 84, a processor 86, and a storage unit 88.

The interface unit 84 is a connection unit as to an external device, and includes, for example, a USB input/output unit 842, and the UE 4 is connected to this USB input/output unit 842 via the above-mentioned USB cable 28.

The processor 86 executes an OS or application program stored in the storage unit 88, and realizes the above-mentioned packet communication method. In the case of downlink (DL), the processor 86 decodes an IP packet from compressed packets transferred from the UE 4.

The storage unit 88 includes a HDD 882 and RAM 884, and makes up a program storage unit or data storage unit. The program storage unit is configured of the HDD 882. With this program storage unit, the above-mentioned OS, a program that realizes the packet communication method, and the above-mentioned driver 606 are stored. The RAM 884 is used for storage of received packet data, and for a work area. This storage unit 88 is configured of a recording medium such as a HDD device, or semiconductor memory such as a flash ROM, or the like.

Figure 18A:
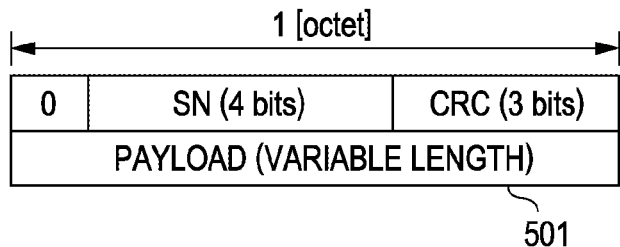
FIGS. 18A through 18C are diagrams indicating a structure example at the time of compression of a RoHC header.
Figure 18B:
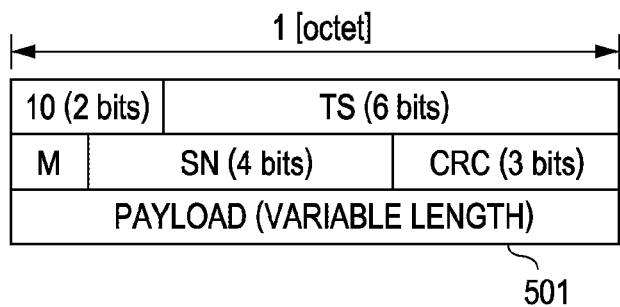
Figure 18C:
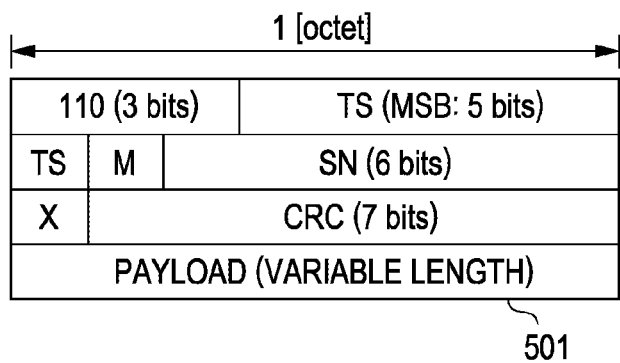

Next, FIGS. 18A through 18C will be referenced regarding the configuration at the time of RoHC header compression. FIG. 18A illustrates the above-mentioned UO-0 packet, FIG. 18B illustrates the above-mentioned UO-1 packet, and FIG. 18C illustrates the above-mentioned UOR-2 packet.

With the UO-0 packet, as illustrated in FIG. 18A, the header portion has sequence number (SN) bits and cyclic redundancy check (CRC) bits. The SN bits indicate the sequence of data. The CRC bits are used for a right or wrong check of the bit configuration. The SN bits are four bits, the CRC bits are three bits, which are configured of one octet. Also, the payload 501 is also 1-octet data.

With the UO-1 packet, as illustrated in FIG. 18B, the header portion has "10" (two bits), timestamp (TS) bits, and a marker (M) bit in addition to the configuration of the UO-0. The TS bits represent time information. Also, the M bit represents the boundary of the data.

With the UOR-2 packet, as illustrated in FIG. 18C, the header portion has "110" (three bits), SN (six bits), TS [most significant bit (MSB): five bits], and an extension (X) bit in addition to the configuration of the UO-1.

Next, FIG. 19 will be referenced regarding the ratio of header compression. FIG. 19 illustrates the ratio of header compression at the time of the maximum compression.

In the event that the protocol header is IP/TCP, while a normal header size (bytes) is 40 [bytes], the size at the time of RoHC compression is compressed to 4 [bytes]. In this case, the compression ratio $[\%] = ((40-4)/40) \times 100 = 90 [\%]$.

In the event that the protocol header is IP/UDP, while a normal header size (bytes) is 28 [bytes], the size at the time of RoHC compression is compressed to 1 [byte]. In this case, the compression ratio $[\%] = ((28-1)/28) \times 100 = 96.4 [\%]$.

In the event that the protocol header is IP/UDP/RTP, while a normal header size (bytes) is 40 [bytes], the size at the time of RoHC compression is compressed to 1 [byte]. In this case, the compression ratio $[\%] = ((40-1)/40) \times 100 = 97.5 [\%]$.

As can be apparent from such compression ratios, use of compressed packets can improve the transfer speed of data, enable efficient communication, and also contribute to effective use of network resources.

According to the above-mentioned embodiments, the following advantages are obtained. (1) A function for communicating compressed IP packets without change at the time of RoHC implementation is provided as the RoHC router, and accordingly, a compressed header packet can be communicated from the UE 4 to the external TE 6, data processing on the UE 4 side can be eased, and throughput can be improved. (2) The RoHC router termination function is provided into the external TE 6, and accordingly, the original packet can be restored from the compressed header packet transferred from the UE 4. (3) With the RoHC router termination, a compressed header packet can readily be restored using the IP header saved at the time of compression operation negotiation completion by downlink (DL), and accordingly, data processing on the external TE 6 side can be eased. (4) In the event that the RoHC is supported by a communication bearer, a compressed IP packet can be transmitted to a transfer destination based on the saved IP header information.

Figure 20A:
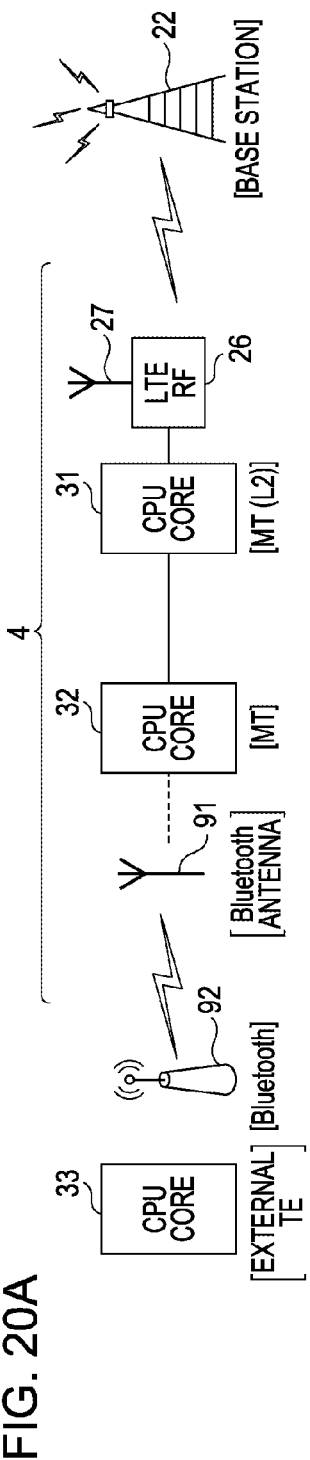
FIGS. 20A and 20B are diagrams illustrating a communication system according to another embodiment.
Figure 20B:
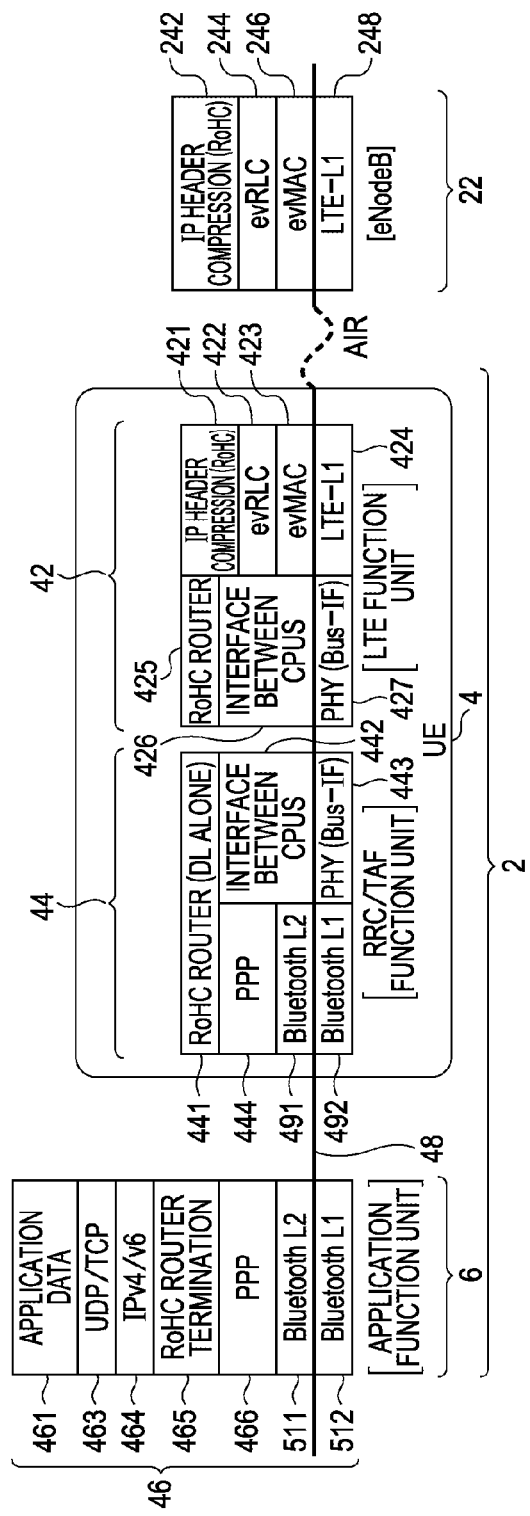

Other Embodiments (1) With the above embodiments, though the UE 4 and external TE 6 have been connected by cable using the cable 28, these connection modes are not restricted to cable connection. Wireless connection may be employed, and accordingly, Bluetooth connection may be employed. With this Bluetooth connection, as illustrated in FIGS. 20A and 20B, the RRC/TAF function unit 44 of the UE 4 includes Bluetooth (L2) 491 and Bluetooth (L1) 492 as interfaces. In response to this, the application function unit 46 of the external TE 6 has to include Bluetooth (L2) 511 and Bluetooth (L1) 512 as interfaces. In this case, an antenna 91 for Bluetooth is provided to the UE 4 side, and a similar antenna 92 is provided to the external TE 6 side, and transmission and reception of radio waves conforming to the Bluetooth standard are performed. According to even wireless connection, the compressed header communicated through the UE 4 can be transferred to the external TE 6, and can be decompressed to the original header on the external TE 6 side.

Figure 21A:
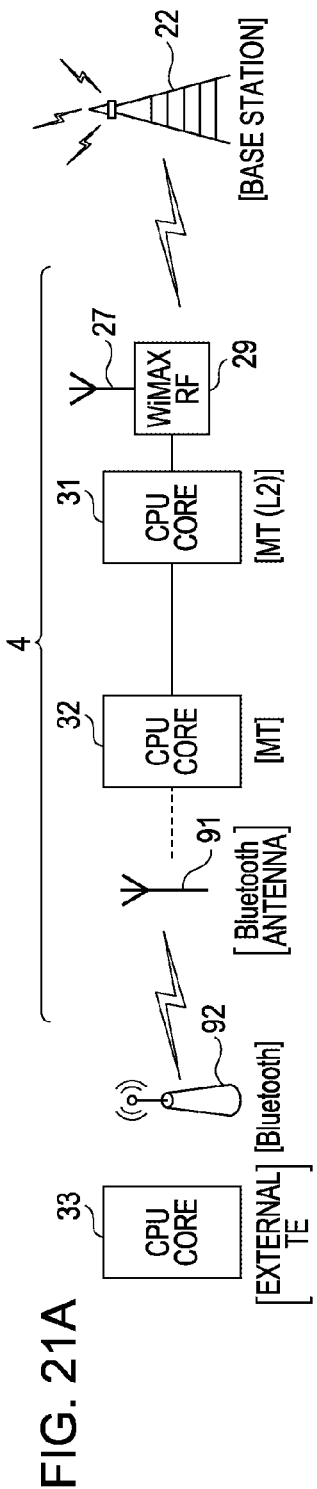
FIGS. 21A and 21B are diagrams illustrating a communication system according to another embodiment.
Figure 21B:
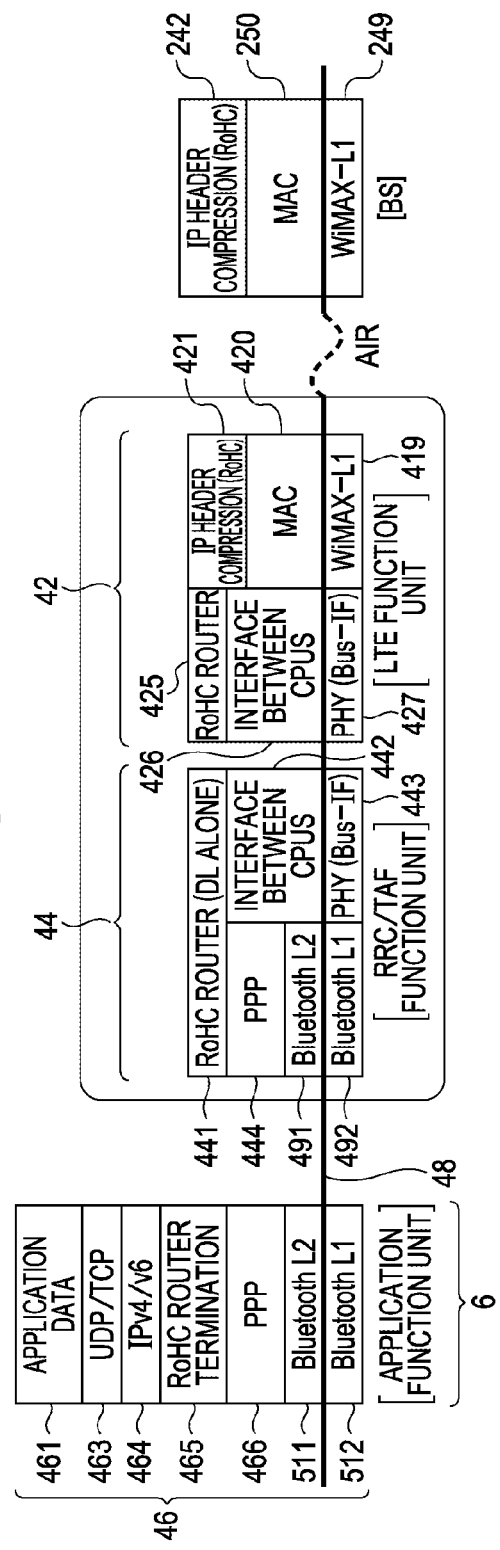

(2) With the above embodiments, though the communication standard for LTE has been employed as the protocol of the wireless connection between the BS 22 and the UE 4, the communication standard for LTE is not restricted to this. For example, WiMAX (Worldwide Interoperability for Microwave Access) may be employed. In this case, as illustrated in FIGS. 21A and 21B, a WiMAX RF unit 29 is employed, and MAC 250 and MAC 420 are employed as the protocols of the BS 22 and LTE function unit 42, respectively. An arrangement may be made wherein the BS 22 includes a WiMAX-L1 function unit 249, and the LTE function unit 42 of the UE 4 includes a WiMAX-L1 function unit 419, and communication connection according to WiMAX is performed between both.

(3) With the above embodiments, though the BS 22 and UE 4 has been connected by radio, an arrangement may be made wherein communication is performed by another communication device standing between the BS 22 and the UE 4.

(4) The above-mentioned functions exemplified in the UE 4 may be applied to a card terminal for LTE.

Comparative Example

Figures 22A, 22B:
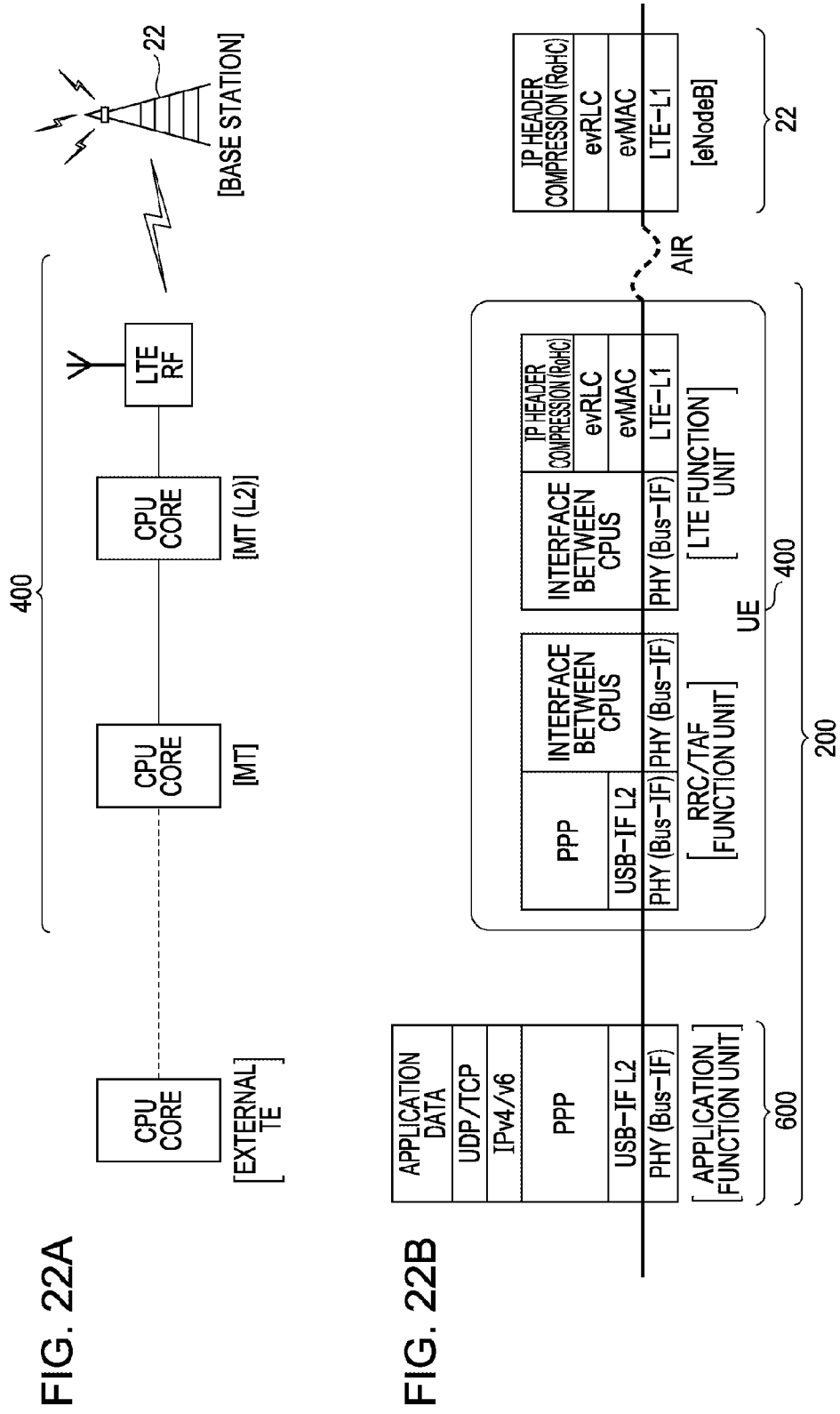
FIGS. 22A and 22B are diagrams illustrating an example of a communication system according to a comparative example.
Figure 23:
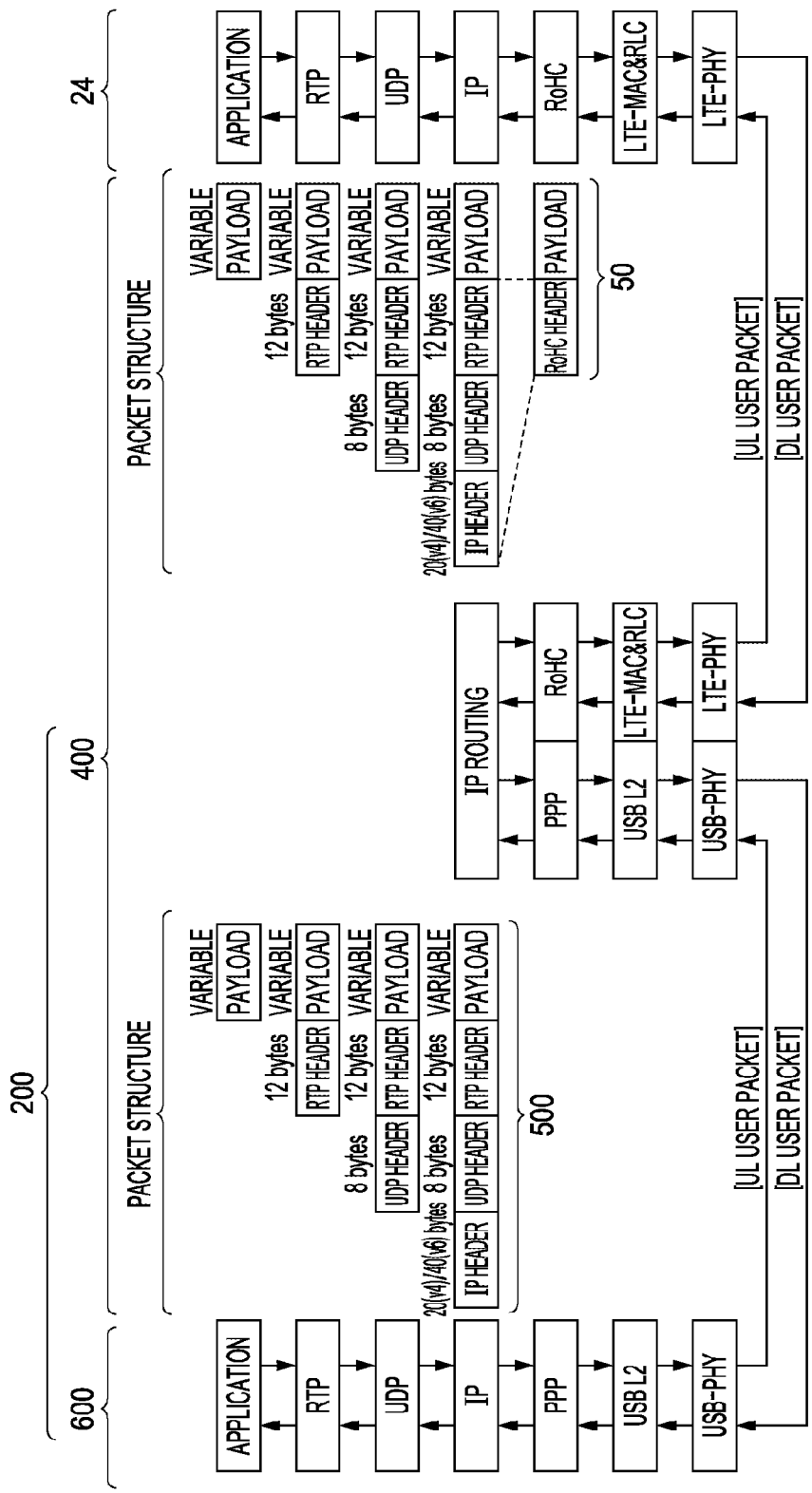
FIG. 23 is a diagram illustrating an example of a packet structure and header processing.

FIGS. 22A, 22B, and 23 will be referenced regarding a comparative example. FIGS. 22A and 22B illustrates the protocol structure of the comparative example. FIG. 23 illustrates packet structures.

The communication system 200 illustrated in FIGS. 22A and 22B is configured to transmit or receive a compressed header packet between the UE 4 and the BS 22 in the same way as with the above-mentioned communication system 2 (FIGS. 3A and 3B). FIG. 22A illustrates a hardware configuration according to the communication standard of LTE, and FIG. 22B illustrates a protocol structure. Though these configuration and structure are the same as those in the above-mentioned communication system 2, these configuration and structure differ from those in the communication system 2 in that the RoHC routers 425 and 441 are not provided.

With the communication system 200 according to this comparative example, header compression is performed between an SS 24 and a UE 400 by RoHC. Therefore, with downlink (DL) from the BS 22 toward the UE 400, a compressed header packet 50 is transmitted from the BS 22 to the UE 400. This packet structure includes a RoHC header compressed from an IP header, UDP header, and RTP header, and a payload.

This compressed header packet 50 is decompressed and decoded into an actual size of IP packet by IP packet routing processing at the UE 400. This actual size of IP packet is transmitted or received between the UE 400 and an external TE 600.

The RoHC employed in LTE and WiMAX is very effective for an IP packet of which the payload is not great. Examples of an IP packet of which the payload is not great include Voice over Internet Protocol (VoIP).

The communication system 200 according to this comparative example has the following problems. These problems have been solved in the above embodiments.

(1) In the event that a compressed header is decompressed to an IP header, UDP header, and RTP header, and an actual size of IP packet is transmitted or received between the external TE 600 and the UE 400, the load of the UE 400 and external TE 600 increases. The UE 400 has to have the LTE function for response to the BS 22, and the modem function for the external TE 6, and performs transfer of the header information between IP packet transfer accompanied with IP header compression and IP packet transfer. That is to say, the UE 400 has to perform compressed packet decompression processing in accordance with transmission or reception of an IP packet as to the external TE 600.

(2) With the UE 400, in the event that Point-to-Point Protocol (PPP) is employed, in the worst case, the packet structure has as twice as many data transfer quantity as this structure, which has a bad effect on throughput.

(3) In the event of employing the UE 400 as a modem of the external TE 600, a transfer protocol such as USB or the like has to be employed between the UE and the external TE, and therefore, IP packets over an upper layer are transferred without compression at the UE serving as a router.

(4) The UE 400 transfers omissible header information between IP packet transfer according to IP header compression serving as an LTE function for base station response, and IP packet transfer serving as a modem function for external TE. Therefore, the UE 400 decompresses compressed packets so as to agree with transmission or reception of IP packets at the external TE 600.

Also, the above-mentioned user equipment (UE) may include a program, memory in which data is stored, and a processor for executing a program, and a part of the above-mentioned functions of the UE may be realized by software.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device to transfer a received packet to a data terminal device, the communication device being coupled to the data terminal device in a wire or wireless system, the communication device comprising:

a determining unit configured to determine whether or not a compression state of a compressed header added to the packet is Full Context indicating a maximum compressed state on a down link in which the packet is transferred from the communication device to the data terminal; and a transfer unit configured to transfer, to the down link, the packet to which the compressed header is added and to transmit an activation request signal used on case of activating a routing module using a robust header compression (RoHC) algorithm to the data terminal device including the routing module, when the compression state of the compressed header is the Full Context, or to decompress the compressed header and to transmit the decompressed header to the data terminal device, when the compression state of the compressed header is not the Full Context.

2. A data transfer method of a communication device to transfer a received packet to a data terminal device, the communication device being coupled to the data terminal device in a wire or wireless system, the data transfer method comprising:

determining whether or not a compression state of a compressed header added to the packet is Full Context indicating a maximum compressed state on a down link in which the packet is transferred from the communication device to the data terminal, by the communication device;

transferring, to the down link, the packet to which the compressed header is added and transmitting an activation request signal used on case of activating a routing module using a robust header compression (RoHC) algorithm to the data terminal device including the routing module, when the compression state of the compressed header is the Full Context, by the communication device;

decompressing the compressed header and transmitting the decompressed header to the data terminal device, when the compression state of the compressed header is not the Full Context, by the communication device; and activating the routing module using the RoHC algorithm and decompressing the compressed header transferred from the communication device, when the data terminal device receives the activation request signal, by the data terminal device.

* * * * *